(12) United States Patent  (10) Patent No.: US 8,805,659 B2
Sarma  (45) Date of Patent: Aug. 12, 2014

(54) SYSTEM AND METHOD FOR UNCERTAINTY QUANTIFICATION IN RESERVOIR SIMULATION

(75) Inventor: Pallav Sarma, San Ramon, CA (US)

(73) Assignee: Chevron U.S.A. Inc., Sam Ramon, CA (US)

( * ) Notice: Subject to any disclaimer, the term of this patent is extended or adjusted under 35 U.S.C. 154(b) by 84 days.

(21) Appl. No.: 13/029,938

(22) Filed: Feb. 17, 2011

(65) Prior Publication Data

US 2012/0215512 A1  Aug. 23, 2012

(51) Int. Cl.
 *G06G 7/48* (2006.01)
(52) U.S. Cl.
 USPC .......................................................... 703/10
(58) Field of Classification Search
 USPC .................................................. 703/6, 9, 10
 See application file for complete search history.

(56) References Cited

U.S. PATENT DOCUMENTS

| | | | | |
|---|---|---|---|---|
| 7,937,343 | B2* | 5/2011 | Zakrzewski | 706/18 |
| 2005/0004833 | A1 | 1/2005 | McRae et al. | |
| 2006/0150129 | A1* | 7/2006 | Chiu et al. | 716/4 |
| 2008/0059143 | A1* | 3/2008 | Chiu et al. | 703/14 |
| 2009/0043555 | A1* | 2/2009 | Busby et al. | 703/10 |
| 2010/0299126 | A1* | 11/2010 | Chugunov et al. | 703/10 |
| 2011/0054869 | A1* | 3/2011 | Li et al. | 703/10 |
| 2011/0307438 | A1* | 12/2011 | Fernández Martínez | 706/52 |
| 2012/0215512 | A1* | 8/2012 | Sarma | 703/10 |
| 2013/0185033 | A1* | 7/2013 | Tompkins et al. | 703/2 |

OTHER PUBLICATIONS

"Stochastic Collocation Methods for Efficient and Accurate Quantification of Uncertainty in Multiphase Reservoir Simulations," Heng Li, Haibin Chang, and Dongxiao Zhang, USC, Society of Petroleum Engineers, Feb. 2009.*
"Polynomial Chaos Expansion for Uncertainties Quantification and Sensitivity Analysis," Thierry Crestaux, Jean-Marc Martinez, Olivier Le Maitre, Olivier Lafitte, SAMO, Jun. 2007.*
"Efficient and Accurate Quantification of Uncertainty for Multiphase Flow with the Probabilitstic Collocation Method," Heng Li, Dongxiao Zhang, USC, Society of Petroleum Engineers, Dec. 2009.*
"An Efficient Computational Framework for Uncertainty Quantification in Multiscale Systems," Cornell University, Xiang Ma, Aug. 2010.*
"Monte Carlo and quasi-Monte Carlo methods," Russel E. Caflisch, Acta Numerica, Cambridge University Press, pp. 1-49, 1998.*
"Monte Carlo Methods in Geophysical Inverse Problems," Malcolm Sambridge, et al., American Geophysical Union, Reviews of Geophysics, 40, 3, Sep. 2002.*

(Continued)

*Primary Examiner* — Matt Kim
*Assistant Examiner* — Maryam Ipakchi
(74) *Attorney, Agent, or Firm* — Ana C. Jaquez

(57) ABSTRACT

A computer-implemented reservoir prediction system, method, and software are provided for quantifying uncertainty and evaluating production performance of a subterranean reservoir. A reservoir simulation model representing a subterranean reservoir and an associated distribution of input variables are provided. A plurality of polynomial chaos expansions is generated. Each polynomial chaos expansion is used to approximate a simulation output of the reservoir simulation model for the distribution of input variables. Deterministic coefficients of the polynomial chaos expansions are calculated using a sampling process, such as a quasi-Monte Carlo method using a low discrepancy sequence. An output variable, such as cumulative oil production, and associated output variable uncertainty are forecasted using the polynomial chaos expansions and the deterministic coefficients such that production performance of the subterranean reservoir can be evaluated.

20 Claims, 17 Drawing Sheets

(56) References Cited

OTHER PUBLICATIONS

Birge, J.R., Quasi-Monte Carlo Approaches to Option Pricing, Technical Report 94-19, Department of Industrial and Operations Engineering, The University of Michigan Ann Arbor, MI, 1995.

Field et al., Convergence Properties of Polynomial Chaos Approximations for L2 Random Variables, public report, Sandia National Laboratories, 2007.

Gautschi, W., Algorithm 726: ORTHPOL-A Package of Routines for Generating Orthogonal Polynomials and Gauss-Type Quadrature Rules, ACM Transactions on Mathematical Software, vol. 20, issue 1, p. 21-62, Mar. 1994.

Isukapalli, S.S., Uncertainty Analysis of Transport-Transformation Models. PhD Thesis, Rutgers State University of New Jersey, New Brunswick NJ, 1999.

Li et al., A Comparative Study of the Probabilistic Collocation and Experimental Design Methods for Petroleum Reservoir Uncertainty Quantification, SPE 140738, SPE Journal, vol. 16, No. 2, Jun. 2011.

Li et al., Efficient and Accurate Quantification of Uncertainty for Multiphase Flow with Probabilistic Collocation Method, SPE 1148028, SPE Journal, vol. 14, No. 4, Dec. 2009.

Li et al., Probabilistic Collocation Method for Flow in Porous Media: Comparisons with Other Stochastic Methods, Water Resources Research, vol. 43, W09409, Sep. 2007.

Niederreiter, H., Low-Discrepancy and Low-Dispersion Sequences, Journal of Number Theory, vol. 30, issue 1, p. 51-70, Sep. 1988.

Reagan et al., Uncertainty quantification in reacting-flow simulations through non-intrusive spectral projection, Combustion and Flame, vol. 132, issue 3, pp. 545-555, 2003.

Sarma et al., Efficient Closed-loop Production Optimization Under Uncertainty, SPE 94241, SPE Europec/EAGE Annual Conference, Madrid, Spain, Jun. 13-16, 2005.

Tatang et al., An Efficient Method for Parametric Uncertainty Analysis of Numerical Geophysical Models, Journal of Geophysical Research: Atmospheres, vol. 102, issue D18, p. 21925-21932, Sep. 27, 1997.

Wiener, N., The Homogeneous Chaos, American Journal of Mathematics, vol. 60, No. 4, p. 897-936, Oct. 1938.

Xiu et al., Modeling Uncertainty in Flow Simulations via Generalized Polynomial Chaos, Journal of Computational Physics, vol. 187, p. 137-167, 2003.

PCT Notification of Transmittal of the International Search Report and the Written Opinion of the International Searching Authority or the Declaration regarding PCT/US2012/025353 dated Sep. 25, 2012.

\* cited by examiner

SYSTEM AND METHOD FOR UNCERTAINTY QUANTIFICATION IN RESERVOIR SIMULATION

TECHNICAL FIELD

This invention relates to quantifying uncertainty in reservoir simulation, and more particularly, to a method, system and computer program product for quantifying uncertainty and evaluating production performance of a subterranean reservoir such as by using polynomial chaos expansions and a non-intrusive spectral projection method.

BACKGROUND

Reservoir simulation is widely used in the oil industry for forecasting the behavior of fluid flow in a subterranean reservoir. Reservoir simulation is performed using reservoir simulation models, which are generally non-unique due to a variety of uncertain input parameters. The uncertainty arises due to scarcity of data, inaccuracy of measured data, and the inherent variability and heterogeneity in the geological formation and fluid properties. As a result, model outputs, such as the forecasted hydrocarbon production, may have significant uncertainty. Uncertainty quantification techniques for analyzing and reducing the uncertainty in reservoir simulation are therefore heavily relied on. For example, quantification can be performed using statistical properties such as the mean, standard deviation, percentiles including P10, P50, P90, or more rigorously, the entire probability density function (PDF). Uncertainty quantification plays a key role in reservoir management as the quality and robustness of business decisions are greatly impacted by the uncertainty estimates of the variables involved in the decision making process.

Monte Carlo simulation is an approach commonly used for uncertainty quantification. In Monte Carlo simulation, a large number of realizations of random inputs are generated and solved to obtain a set of model outputs, which can be further analyzed statistically. Monte Carlo simulation is conceptually straightforward and easy to implement, however, it requires a large computational effort. Due to the large number of model simulations typically needed to obtain statistically accurate results, Monte Carlo simulations are cost prohibitive in most real applications of reservoir simulation, especially for large scale problems.

Experimental design methods associated with different response surface methodologies are widely used alternatives for assessing uncertainties in reservoir production and economic appraisal. Experimental design methods are typically more efficient than Monte Carlo simulation. However, a key disadvantage of experimental design methods is that they do not take into account the full probability distributions of the parameters consistently while creating the response surface. In particular, the full PDFs are only used during post-processing and not used for sampling and design. Furthermore, because all samples are equally weighted for response surface generation, there is an inherent assumption that the distributions of these parameters are uniform. As a result, experimental design methods may not be appropriate when parameter distributions are arbitrary, which is common in real-world applications. However, these limitations are often disregarded and experimental design methods are broadly used in the industry.

Another approach for uncertainty quantification that has recently been introduced to the petroleum industry is the probabilistic collocation method (PCM). This approach has been applied to uncertainty quantification in the context of optimization of petroleum reservoir production and for quantification of uncertainty for flow in porous media in hydrogeology and petroleum engineering. In the probabilistic collocation method, dependent random variables are represented by employing bi-orthogonal polynomial functions, or polynomial chaos expansions, as the bases of the random space. The polynomial chaos expansions (PCEs) are orthogonal to each other and also with respect to the specific PDFs of the input random variables. They are capable of encapsulating the possibly nonlinear relationships between input and output random variables, and therefore can be used as proxies to the simulation model for efficient uncertainty quantification. PCEs have a significant advantage over other proxies or response surfaces as they converge to the true distribution of the output random variable of interest, such as cumulative oil production, as the order of the PCE and number of simulations used to calculate the PCE coefficients is increased. In the PCM method, the coefficients of the PCE are calculated via collocation or regression. Like most response surface methods, the simulator is used as a black-box in PCM, and is thus very easy to implement. There are, however, some issues with PCM that limit the practical applicability of the method to large scale problems. Mainly, the number of simulations required with the PCM approach to create the PCE is directly dependent on the number of terms in the PCE, which increases exponentially with the PCE order and number of random variables.

While the above methods can be used to quantify uncertainty for reservoir simulation, a robust and efficient method is needed for uncertainty quantification that avoids the aforementioned shortcomings, particularly when being applied to large scale reservoir simulation problems.

SUMMARY

A computer-implemented method for quantifying uncertainty and evaluating production performance of a subterranean reservoir is disclosed. The method includes providing a reservoir simulation model representing a subterranean reservoir and an associated distribution of input variables. A plurality of polynomial chaos expansions are generated. Each polynomial chaos expansion is used to approximate a simulation output to the reservoir simulation model for the distribution of input variables. Deterministic coefficients of the polynomial chaos expansions are calculated using a sampling process. An output variable and associated output variable uncertainty are forecast using the polynomial chaos expansions and the deterministic coefficients. Production performance of the subterranean reservoir is evaluated responsive to the output variable and associated output variable uncertainty.

In some embodiments, the deterministic coefficients of the polynomial chaos expansion are calculated to at least a $5^{th}$ order. In some embodiments, the deterministic coefficients are calculated using non-intrusive spectral projection.

In some embodiments, the sampling process comprises a quasi-Monte Carlo method. A low discrepancy sequence, such as a Sobol sequence, can be utilized in the sampling process.

In some embodiments, the deterministic coefficients are cross-validated. For example, the deterministic coefficients are calculated to a predetermined order. An error from the polynomial chaos expansions is calculated using first order terms of the polynomial chaos expansions and the deterministic coefficients calculated to the predetermined order. The next higher order term is then added to the polynomial chaos expansions and an updated error from the polynomial chaos expansions is calculated. The higher order term last added to the polynomial chaos expansions are maintained if the updated error is reduced, or removed if the updated error is increased. The steps of increasing the order and comparing the error to the previous iteration are repeated until each order term of the polynomial chaos expansions has been cross-validated.

Examples of output variables include cumulative oil, water, or gas production. In some embodiments, the output variable and associated output variable uncertainty are output as a probability density function. In some cases, the output variable and associated output variable uncertainty are output as a cumulative distribution function.

According to another aspect of the present invention, a system for evaluating a production performance of a subterranean reservoir is disclosed. The system includes a database, a computer processor, and a software program. The database is configured to store data including reservoir simulation models representing a subterranean reservoir, a distribution of input variables, polynomial chaos expansions, deterministic coefficients of the polynomial chaos expansions, output variables, and output variable uncertainty. The computer processer is configured to receive the stored data from the database, and to execute software using the stored data. The software program is executable on the computer processor and includes a non-intrusive spectral projection module and a polynomial chaos expansion module. The non-intrusive spectral projection module is configured to calculate the deterministic coefficients of the polynomial chaos expansions using a sampling process. Each polynomial chaos expansion is used to approximate a simulation output of the reservoir simulation model for the distribution of input variables. The polynomial chaos expansion module is configured to generate the polynomial chaos expansions. The polynomial chaos expansion module is also configured to forecast an output variable and associated output variable uncertainty using the polynomial chaos expansions and deterministic coefficients calculated by the non-intrusive spectral projection module.

In some embodiments, the non-intrusive spectral projection module calculates the deterministic coefficients of the polynomial chaos expansions to at least a $5^{th}$ order. The sampling process used by the non-intrusive spectral projection module can be a quasi-Monte Carlo method using a low discrepancy sequence, such as a Sobol sequence.

In some embodiments, the deterministic coefficients are cross-validated using the non-intrusive spectral projection module and the polynomial chaos expansion module. For example, the non-intrusive spectral projection module is configured to calculate deterministic coefficients to a predetermined order. The polynomial chaos expansion module is configured to calculate an error from the polynomial chaos expansions using first order terms of the polynomial chaos expansions and the deterministic coefficients calculated to the predetermined order. The next higher order term is then added to the polynomial chaos expansions and an updated error from the polynomial chaos expansions is calculated. The higher order term last added to the polynomial chaos expansions is maintained if the updated error is reduced, or removed if the updated error is increased. The steps of increasing the order and comparing the error to the previous iteration are repeated until each order term of the polynomial chaos expansions has been cross-validated.

In some embodiments, the system includes a display. The display can communicate with the polynomial chaos expansion module of the software program such that the output variable and associated output variable uncertainty are transformed into image data representations and are output to the display.

According to another aspect of the present invention, a computer program product comprising computer usable medium having a computer readable program code embodied therein is disclosed. The computer readable program code comprises a non-intrusive spectral projection module and a polynomial chaos expansion module. The non-intrusive spectral projection module is configured to calculate deterministic coefficients of polynomial chaos expansions using a sampling process. Each polynomial chaos expansion is used to approximate a simulation output of a reservoir simulation model for a distribution of input variables. The polynomial chaos expansion module is configured to generate the polynomial chaos expansions. The polynomial chaos expansion module is also configured to forecast an output variable and associated output variable uncertainty for the polynomial chaos expansions using the deterministic coefficients calculated by the non-intrusive spectral projection module.

In some embodiments, the deterministic coefficients are cross-validated using the non-intrusive spectral projection module and the polynomial chaos expansion module. For example, the non-intrusive spectral projection module is configured to calculate deterministic coefficients to a predetermined order. The polynomial chaos expansion module is configured to calculate an error from the polynomial chaos expansions using first order terms of the polynomial chaos expansions and the deterministic coefficients calculated to the predetermined order. The next higher order term is added to the polynomial chaos expansions and an updated error from the polynomial chaos expansions is calculated. The higher order term last added to the polynomial chaos expansions is maintained if the updated error is reduced, or removed if the updated error is increased. The steps of increasing the order and comparing the error to the previous iteration are repeated until each order term of the polynomial chaos expansions has been cross-validated.

DETAILED DESCRIPTION

Figure 1:
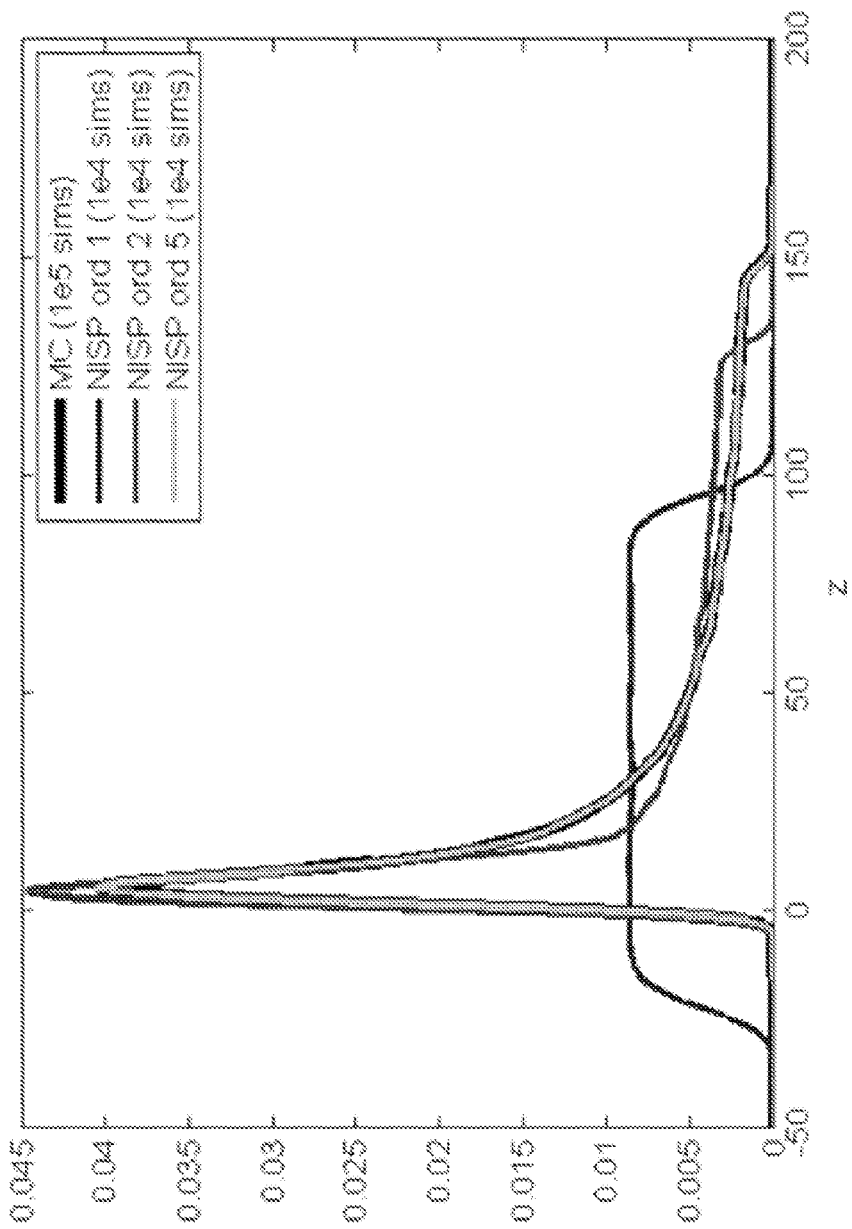
FIG. 1 illustrates the convergence of a probability density function as the order of the polynomial chaos expansion is increased to a reference probability density function obtained by Monte Carlo simulation, according to an embodiment of the present invention.

Embodiments of the present invention relate to uncertainty quantification in reservoir simulation using polynomial chaos expansions (PCEs). As will be described, a sampling approach is utilized to estimate PCE coefficients. By utilizing sampling, the number of simulations required to estimate the PCE coefficients is generally independent of the number of random variables and PCE order. Low discrepancy or quasi-random sampling methods, such as a Sobol sequence, can be used for sampling. These sampling methods can produce linear error convergence of the estimate of the PCE coefficients for a reasonably large number of input random variables. Furthermore, statistically rigorous error estimates of the PCE coefficients can also be provided. Aspects of the present invention further include eliminating PCE coefficients that have been estimated incorrectly, thereby improving the accuracy and robustness of the sampling method. Accordingly, embodiments of the present invention result in the more robust and efficient uncertainty quantifications and reduction of uncertainty of variables used in a reservoir simulation model of a subterranean reservoir, particularly for large scale reservoir simulation problems.

Polynomials Chaos Expansions (PCEs)

Polynomial chaos expansions, which can be considered as a spectral expansion of random variables, have recently gained a great deal of popularity for uncertainty quantification in reservoir simulation. PCEs have a significant advantage over other response surfaces, particularly because they converge to the true distribution of the output random variable of interest, such as cumulative oil production, as the order of the PCE and number of simulations used to calculate the PCE coefficients is increased. The applicability of PCEs for uncertainty quantification can be described by considering a random variable z with finite variance, which is an output of a forward model, such as:

$$z = g(\xi) \qquad \text{Equation (1)}$$

Here, $\xi = [\xi_1, \ldots, \xi_N]$ is a vector of N independent random variables, where $g(\xi)$ represents the simulation model.

Because evaluating $g(\xi)$ would be very expensive, approximations to the simulation model are generated and used for efficient evaluation. For example, a polynomial chaos expansion can be used for approximating the simulation model, and can be given as:

$$\tilde{z} = \sum_{k \geq 0} \beta_k \psi_k(\xi) \qquad \text{Equation (2)}$$

Here $\beta_k$ are deterministic coefficients, and $\psi_k(\xi)$ are 1 to N dimensional bi-orthogonal polynomials, which are orthogonal to each other and to the distribution of $\xi$.

Originally, polynomial chaos expansion was developed using Hermite polynomials, which are a subset of Askey-scheme polynomials, in terms of Gaussian random variables. The general expression for Hermite polynomials $H_n$ is given by:

$$H_N(\xi_1, \ldots, \xi_N) = \\ \exp\left(\frac{1}{2}\xi^T\xi\right)(-1)^N \frac{\partial^N}{\partial \xi_1 \ldots \partial \xi_N} \exp\left(-\frac{1}{2}\xi^T\xi\right) \qquad \text{Equation (3)}$$

where $\xi$ denotes a vector of N independent Gaussian random variables. Equation (3) can be reduced to simpler forms, such as in 1D Hermite polynomials:

$$\psi_0=1, \psi_1=\xi, \psi_2=\xi^2-1, \psi_2=\xi^3-3\xi, \ldots \qquad \text{Equation (4)}$$

The multi-dimensional Hermite polynomials represent tensor products of the 1D Hermite polynomials.

Polynomial chaos expansion has been generalized to other polynomials in the Askey-scheme for different types of input random variables. In particular, the input random variables can be any of the classic probability distributions in the Askey-scheme such that they are not restricted to the Gaussian distribution. Subsets of the orthogonal polynomials in the Askey-scheme have different weighting functions in their orthogonality relationship. Some of these weighting functions correspond to the probability function of certain random distributions. Accordingly, the nature of the distributions of the input random variables can establish the types of orthogonal polynomials used.

Examples of polynomial chaos expansions that are associated with particular distributions include, but are not limited to, Legendre polynomial chaos expansion for uniform distributions, Laguerre polynomial chaos expansion for Gamma distributions, Jacobi polynomial chaos expansion for Beta distributions, Charlier polynomial chaos expansion for Poisson distributions, Meixner polynomial chaos expansion for negative Binomial distributions, Krawtchouk polynomial chaos expansion for Binomial distributions, and Hahn polynomial chaos expansion for Hypergeometric distributions.

For a given input distribution, these polynomial chaos expansions typically yield a better convergence rate than other expansions or arbitrary functions. Thus, an optimal convergence rate can be realized if an appropriate Askey-scheme polynomial chaos expansion is chosen according to the distribution of random input variables. However, in reservoir models the probability distributions of input random variables can be arbitrary. For such distributions, the associated orthogonal polynomial expansions can be constructed numerically, such as through numerical integration.

The greatest benefit of PCEs as opposed to other polynomials or approximations is that the distribution of $\tilde{z}$ converges to the true distribution of z as the order of the PCE is increased. This implies that PCEs do not have the problem of over-fitting, which plagues many other proxies. However, the coefficients $\beta_k$ have to be estimated correctly for the convergence results to be valid. As will be described, different PCE based approaches differ in the method used to calculate the coefficients $\beta_k$. For a given number of simulations, the coefficients $\beta_k$ associated with higher order PCE terms have larger estimation errors compared to lower order terms, and therefore, there is a balance between the number of simulations and the maximum possible order of a PCE that can be reliably used.

FIG. 1 demonstrates the ability of PCEs to converge to the true distribution as the order of PCE is increased. In FIG. 1, the forward model is a simple one-dimensional nonlinear model given as:

$$z=\exp(\xi); \xi \sim \text{uniform}[1,5] \quad \text{Equation (5)}$$

Here, Legendre polynomials are used as the optimal orthogonal polynomials. As seen in FIG. 1 the dashed line is obtained using standard Monte Carlo simulation of $z=\exp(\xi)$ with a very large number of simulations. In particular, 1e5 simulations are used. As used herein, the Monte Carlo simulations are considered to be the reference distribution of Z. The solid lines are obtained using PCE approximations of z for different PCE orders. As the order of the PCE is increased, the distribution of $\tilde{z}$ progressively becomes closer to the reference distribution. With a $5^{th}$ order PCE, the distribution of $\tilde{z}$ is almost the same as that of z. As will be discussed in greater detail herein, a non-intrusive spectral projection (NISP) is used to calculate the coefficients $\beta_k$ in FIG. 1. Additionally, a large number of simulations are used (1e4) such that all coefficients are calculated accurately.

Probabilistic Collocation Method

The probabilistic collocation method (PCM) can be used to solve for the coefficients of the polynomial chaos expansions. However, as previously discussed, there are key limitations of PCM for application to large-scale simulation models.

In the traditional PCM, the number of simulations required is equal to the number of coefficients (terms) in the PCE expansion, which grows exponentially with the number of random variables and order of the PCE. The PCE coefficients are obtained by solving a linear system of equations of size M, where M is the number of coefficients, which is given by:

$$M = \frac{(N+p)!}{N!p!} \quad \text{Equation (6)}$$

Here, N is the number of random variables and p is the polynomial order. Even for a relatively small problem with 10 variables and 5th order polynomials, the number of terms is 3003. Accordingly, the number of simulations required for traditional PCM becomes impractical for realistic problems.

A modified form of PCM applies a least-squares technique to determine the PCE coefficients. In particular, instead of solving a linear system, as regression problem is solved. This eliminates the need for the number of simulations to match the number of terms in the PCE. However, if the number of simulations is sufficiently less compared to the number of terms, it is very hard to determine the accuracy of the estimated coefficients as the regression problem is severely underdetermined and non-unique.

One approach to mitigate this problem is by only using "pure" terms from the PCE and discarding the cross terms, which greatly reduces the number of coefficients. However, this only works if the true forward model does not contain such nonlinear cross-effects, which is generally not true for reservoir simulation models. Furthermore, the benefit of convergence to the true distribution as the order of the PCE is increased is lost when using such an approach.

Figure 2:
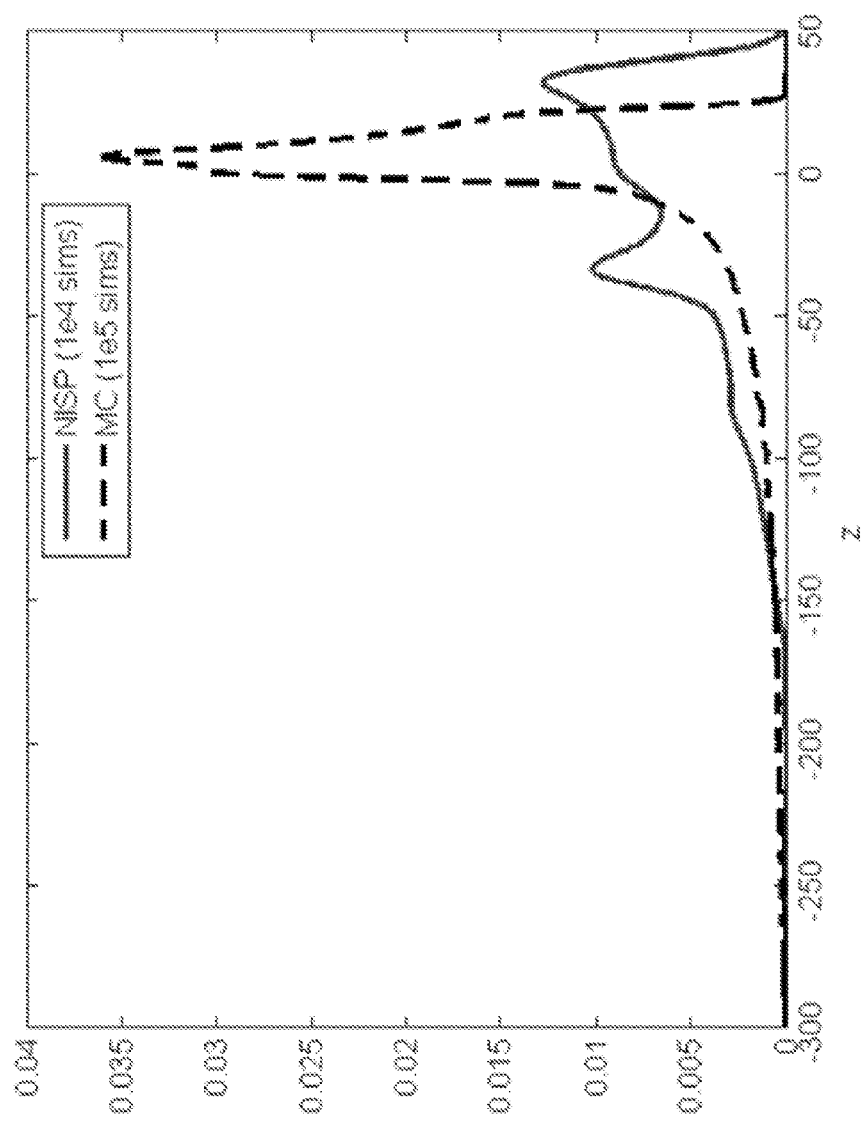
FIG. 2 illustrates the non-convergence of a probability density function obtained using a polynomial chaos expansion while neglecting cross terms to a reference probability density function obtained by Monte Carlo simulation, according to an embodiment of the present invention.

FIG. 2 demonstrates the effect of retaining only the "pure" terms of a PCE where the forward model includes nonlinear combinations of the random variables. The forward model is given as:

$$z=\exp(\xi_1)\{\sin(\xi_1)+\cos(\xi_2)\}; \xi_1 \sim \text{uniform}[1,5],$$
$$\xi_2 \sim \text{uniform}[3,8] \quad \text{Equation (7)}$$

The dashed line is a probability density function obtained by Monte Carlo simulation with 1e5 simulations. Again, Monte Carlo simulations are considered to be the reference PDF. The solid line represents a probability density function obtained using a polynomial chaos expansion while neglecting the cross terms. The PDF of $\tilde{z}$ while neglecting the cross terms shown in solid line does not converge to the reference PDF, even when a PCE of order 5 and 1e4 simulations are used to calculate the coefficients $\beta_k$.

An additional limitation of PCM is that the solution of the linear system, or the regression problem, used to calculate the coefficients can be time consuming if M is large. In PCM, the roots of the polynomials must be calculated to determine the collocation points. This can be difficult for arbitrary polynomials, which are obtained if the distributions of the random variables are arbitrary. Also, for discrete random variables, depending on the order of the polynomial and number of discrete values of the discrete variables, sufficient unique collocation points may not even exist, which can be a problem. Finally, the collocation points, as obtained in PCM, are dependent on the distribution of the input random variables. Thus, if they are changed later, the PCE coefficients have to be calculated again from new simulations.

Non-Intrusive Spectral Projection

The above limitations can be mitigated by utilizing non-intrusive spectral projection (NISP) for calculating the coefficients of a PCE. Using the orthogonality properties of PCEs, the PCE coefficients $\beta_k$ for NISP are given as:

$$\beta_k = \frac{E[g(\xi)\psi_k(\xi)]}{E[\psi_k(\xi)\psi_k(\xi)]} \quad \text{Equation (8)}$$

The denominator in the above equation is an expectation of known PCE polynomials, and can be calculated analytically. However, the numerator is an expectation that involves the forward model $g(\xi)$. Therefore, the estimation of the coefficients $\beta_k$ largely amounts to accurate calculation of the numerator.

Calculation of the numerator can be posed as a sampling problem or an N dimensional numerical integration problem, and in both cases, can be written as:

$$E[g(\xi)\psi_k(\xi)] \approx \frac{1}{N_s}\sum_{i=1}^{N_s} w_i g(\xi_i)\psi_k(\xi_i) \quad \text{Equation (9)}$$

In Equation (9), $N_s$ is the number of samples or simulations, and $w_i$ are weights for each sample point, which depends on the sampling method used. For example, if standard Monte Carlo sampling is used, $w_i=1$ and the samples are obtained randomly. If numerical integration techniques, such as quadrature, are used then these weights are different and the samples are distributed uniformly in the integration domain. One skilled in the art will recognize that the number of simulations $N_s$ is not directly dependent on the number of terms in the PCE (M), and only a sufficient number of simulations are needed to reduce the error in the estimate of coefficients $\beta_k$ to an acceptable level. Another benefit of this approach is that each coefficient $\beta_k$ is evaluated independently of other coefficients once the $N_s$ simulations are evaluated. This implies that in NISP, the estimate of one coefficient is not dependent on that of another coefficient. If the coefficients are dependent, as in PCM where the coefficients are evaluated by solving a coupled linear system or a regression problem, then the typically less accurate estimates of higher order coefficients can reduce the accuracy of the lower order coefficients estimates.

To determine the best approach to apply for estimating the expectation of Equation (9), the rate of convergence of the error of estimation of the expectation with $N_s$ should be understood. For typical numerical integration techniques, such as quadrature and cubature, the error converges at the rate $0(1/N_s^{c/N})$. Here c is a positive constant dependent on the particular algorithm, and because this rate is dependent on N, it is not practical for N>4 or 5. Standard Monte Carlo error converges at the rate $0 \ (1/\sqrt{N_s})$, which is independent of dimension N. This however, is a slow rate of convergence typically requiring 500-1000 simulations for reservoir simulations problems, which still may not be practical.

Embodiments of the present invention utilize a quasi-Monte Carlo method using low discrepancy sequences, which produces an error convergence rate of $0 \ (1/N_s)$ for a large class of problems. As used herein, the term quasi-Monte Carlo method is a deterministic version of the Monte Carlo method where the random samples of the Monte Carlo method are replaced by predetermined deterministic points. The predetermined deterministic points are selected such that the deterministic error bound is smaller than the probabilistic Monte Carlo error bound. The term low discrepancy sequence as used herein refers to a sequence with the property that for all values of N, its deterministic points have a low discrepancy, which is a measure of deviation from a uniform distribution. Examples of low discrepancy sequences include Hammersley points, Halton points, Sobol points, and hyperbolic-cross points.

For illustration of the construction of a Sobol sequence, Sobol points in a single dimension (d=1) can be defined using a polynomial of the form:

$$P(x)=x^n+a_1 x^{n-1}+\ldots+a_{n-1}x+1 \qquad \text{Equation (10)}$$

The coefficients $a_i$ are either 0 or 1. Direction numbers $v_i$ for i>n is given by the following recurrence relation:

$$v_i=a_1 v_{i-1} \oplus a_2 v_{i-2} \oplus \ldots \oplus a_{n-1}v_{i-n+1} \oplus v_{i-n} \oplus (v_{i-n}/2^n) \qquad \text{Equation (11)}$$

where $\oplus$ denotes a bit-by-bit "exclusive or" operation. The initial numbers $v_1=m_1/2, \ldots, v_n=m_n/2^n$ can be chosen freely provided $m_i$ is odd and $0<m_i<2^i$ for $i=1,2,\ldots,n$. Using the direction numbers $v_i$, the one-dimensional Sobol sequence $x_1, x_2, \ldots$ is given as:

$$x_k=b_1 v_1 \oplus b_2 v_2 \oplus \ldots \oplus b_w v_w, k \geq 0 \qquad \text{Equation (12)}$$

where $k=\sum_{i=0}[\log k] b_i 2^i$ is the binary representation of k. For higher dimensions (d>1), the first d polynomials $P_1, P_2, \ldots, P_d$ are used. If $\{x_k^i\}_{k=1}^{\infty}$ denotes the one-dimensional Sobol sequence generated by the polynomial $P_i$, the d-dimensional Sobol points can be defined as $$X_k=(x_k^1, x_k^2, \ldots, x_k^d) \qquad \text{Equation (13)}$$

Equations (12) and (13) are examples of low discrepancy sequences that can be utilized for quasi-Monte Carlo methods. Alternatively, faster techniques are known which produce these points in a "shuffled" or permuted sequence.

One remaining issue is that, for a given number of simulations $N_s$, the error in the estimate of $\beta_k$ is dependent on the order of PCE term $\psi_k (\xi)$ associated with it. The higher the order of $\psi_k (\xi)$, the greater is the error in the estimate of $\beta_k$ for a given $N_s$. If a coefficient $\beta_k$ has significant error, then keeping it in the PCE expansion will reduce the accuracy of the expansion. However, because $\beta_k$ is estimated from $N_s$ simulations via sampling, rather than using a data-fitting approach as in PCM and most other proxies, the simulations can be used to determine whether an estimated $\beta_k$ is sufficiently accurate to retain or if it should be discarded. Therefore, no additional simulations are required to perform a cross-validation of the estimated coefficient $\beta_k$. For example, the following can be performed:

1. Calculating the PCE coefficients to a reasonably high order (such as $6^{th}$ order) using Equations (8) and (9) with a sampling process, such as the quasi-Monte Carlo method.
2. Calculating approximation error $E^j=\Sigma \|z-\tilde{z}\|$ from all of the samples, where the iteration index is set to 1 (j=1) and only the $1^{st}$ order terms of the PCE are used with the coefficients already calculated in step 1.
3. Updating the PCE by adding a higher order term starting with the $2^{nd}$ order PCE terms.
4. Calculating the error $E^{j+1}$ using the updated PCE.
5. If $E^{j+1}<E^j$, keep the higher order term, otherwise discard the higher order term by setting $\beta_k=0$ for the last term added to the PCE.
6. Repeating this process until all PCE coefficients calculated in step 1 have been validated.

Figure 3:
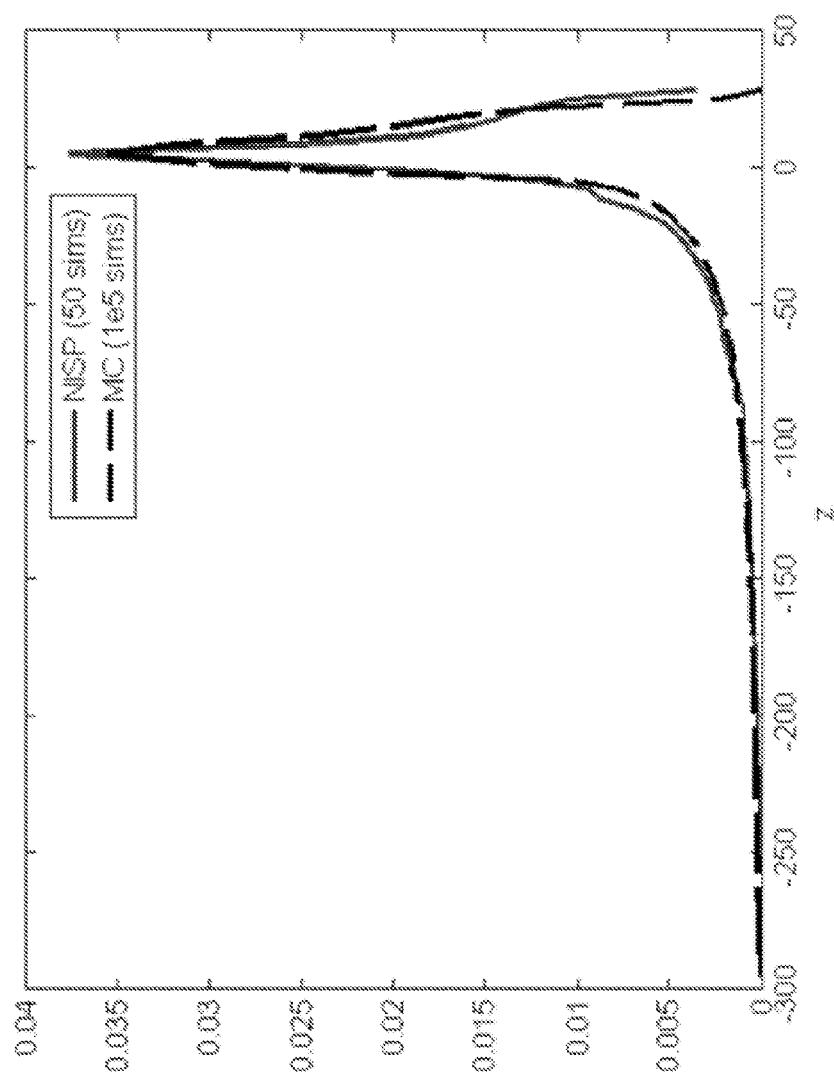
FIG. 3 illustrates the convergence of a probability density function obtained using a full polynomial chaos expansion including cross terms to a reference probability density function obtained by Monte Carlo simulation, according to an embodiment of the present invention.

FIG. 3 demonstrates the results for the forward model of Equation (7) using a $5^{th}$ order full PCE with NISP. In this case, 50 simulations are sufficient to get a very good estimate of the true PDF. In comparing the results of FIG. 3 to those of FIG. 2, including the cross terms in the PCE greatly increase the accuracy of the distributions of the output variable.

Figure 4:
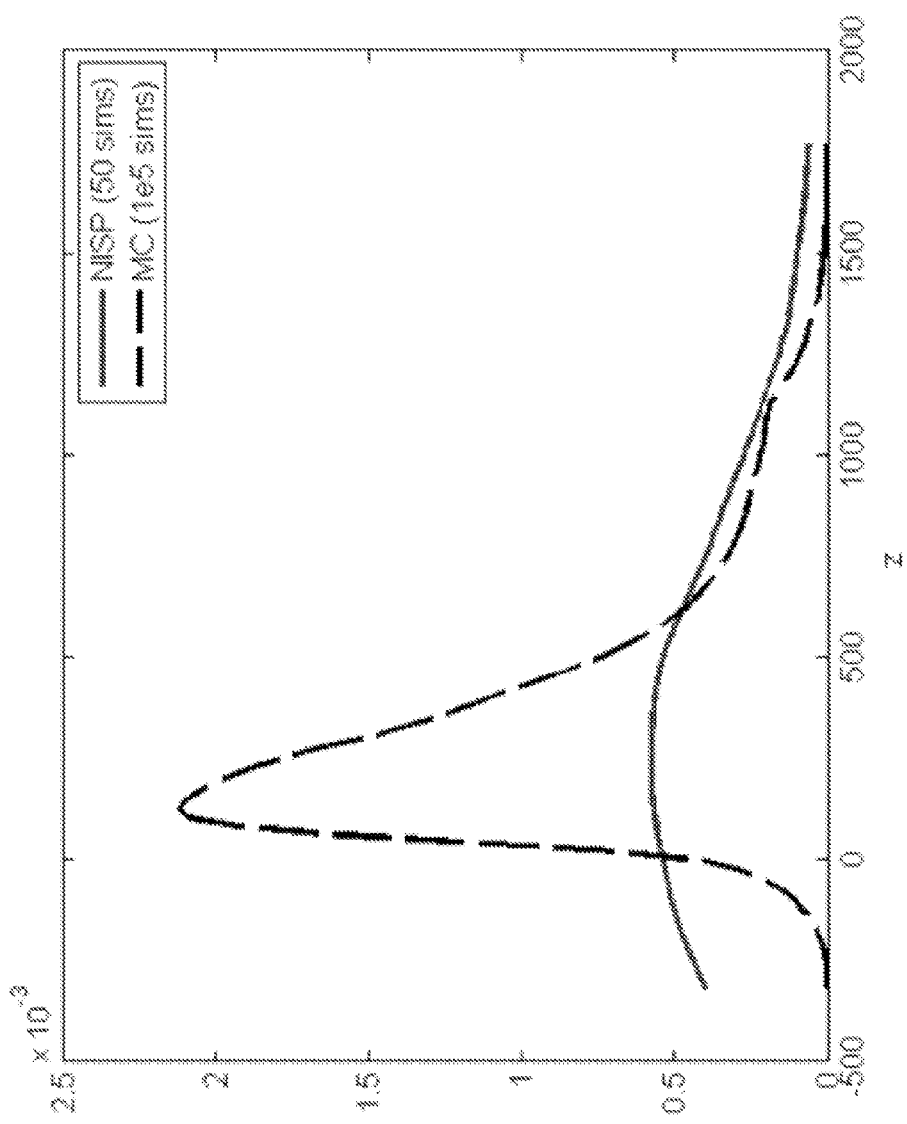
FIG. 4 illustrates the non-convergence of a probability density function obtained using a polynomial chaos expansion without cross-validating coefficients to a reference probability density function obtained by Monte Carlo simulation, according to an embodiment of the present invention.
Figure 5:
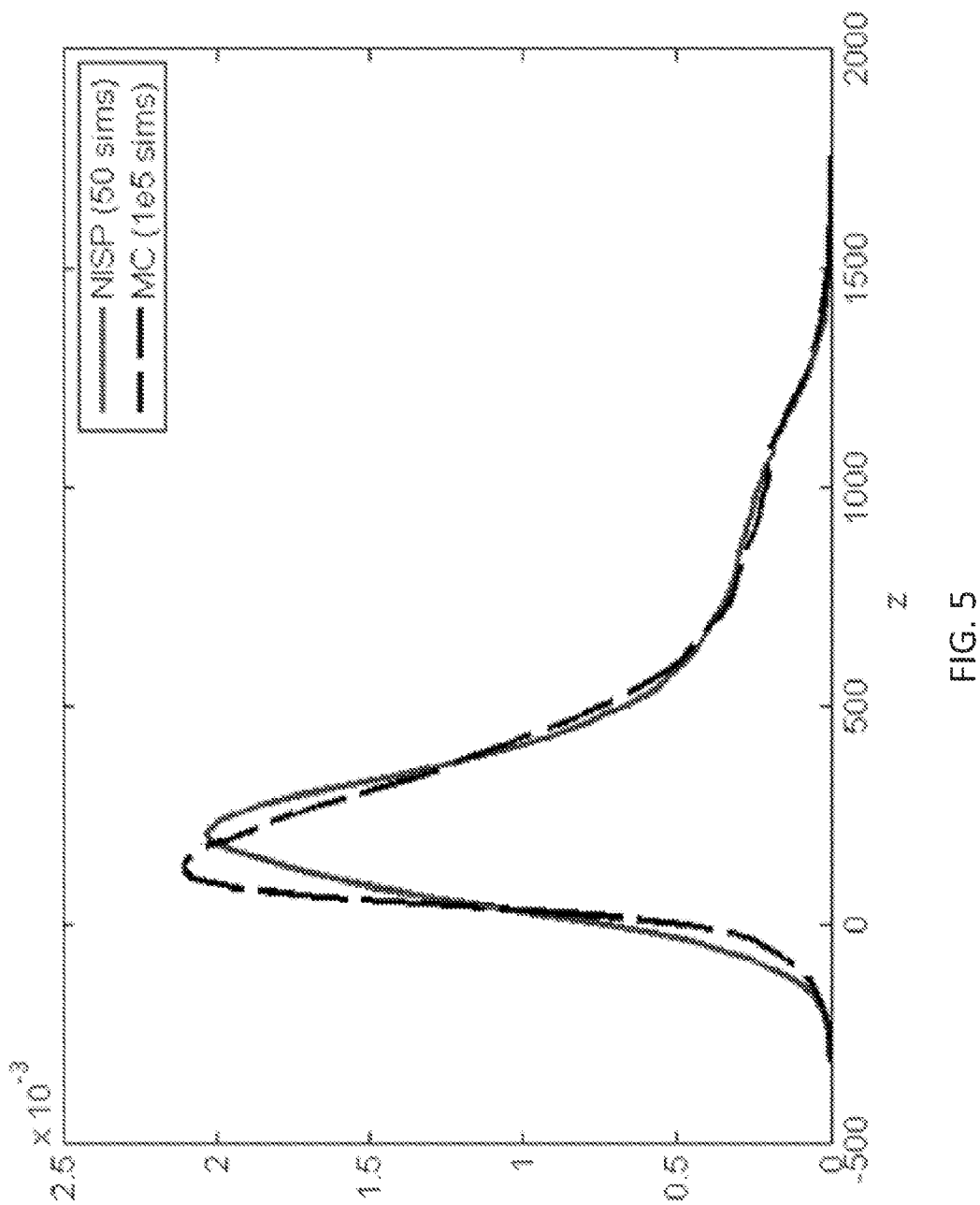
FIG. 5 illustrates the convergence of a probability density function obtained using a polynomial chaos expansion while cross-validating coefficients to a reference probability density function obtained by Monte Carlo simulation, according to an embodiment of the present invention.

FIG. 4 and FIG. 5 demonstrate results for the following forward model with 5 random variables:

$$z = \exp(\xi_1)\{\sin(\xi_1) + \cos(\xi_2)\} + \exp(\xi_3) + \exp(\xi_4) + \exp(\xi_5); \qquad \text{Equation (10)}$$

$$\xi \sim \text{uniform}$$

In FIG. 4, with 50 simulations and a $5^{th}$ order PCE, if all coefficients $\beta_k$ are retained irrespective of whether they are estimated correctly or not, a very poor estimate of the PDF is obtained. On the other hand, if the incorrectly estimated terms are discarded using the cross-validation approach discussed above, a much better PDF is obtained, as shown in FIG. 5.

The above described methods can be implemented in the general context of instructions executed by a computer. Such computer-executable instructions may include programs, routines, objects, components, data structures, and computer software technologies that can be used to perform particular tasks and process abstract data types. Software implementations of the above described methods may be coded in different languages for application in a variety of computing platforms and environments. It will be appreciated that the scope and underlying principles of the above described methods are not limited to any particular computer software technology.

Moreover, those skilled in the art will appreciate that the above described methods may be practiced using any one or a combination of computer processing system configurations, including, but not limited to, single and multi-processer systems, hand-held devices, programmable consumer electronics, mini-computers, or mainframe computers. The above described methods may also be practiced in distributed computing environments where tasks are performed by servers or other processing devices that are linked through a one or more data communications networks. In a distributed computing environment, program modules may be located in both local and remote computer storage media including memory storage devices.

Also, an article of manufacture for use with a computer processor, such as a CD, pre-recorded disk or other equivalent devices, could include a computer program storage medium and program means recorded thereon for directing the computer processor to facilitate the implementation and practice of the above described methods. Such devices and articles of manufacture also fall within the spirit and scope of the present invention.

As will be described, the invention can be implemented in numerous ways, including for example as a method (including a computer-implemented method), a system (including a computer processing system), an apparatus, a computer readable medium, a computer program product, a graphical user interface, a web portal, or a data structure tangibly fixed in a computer readable memory. Several embodiments of the present invention are discussed below. The appended drawings illustrate only typical embodiments of the present invention and therefore are not to be considered limiting of its scope and breadth.

Figure 6:
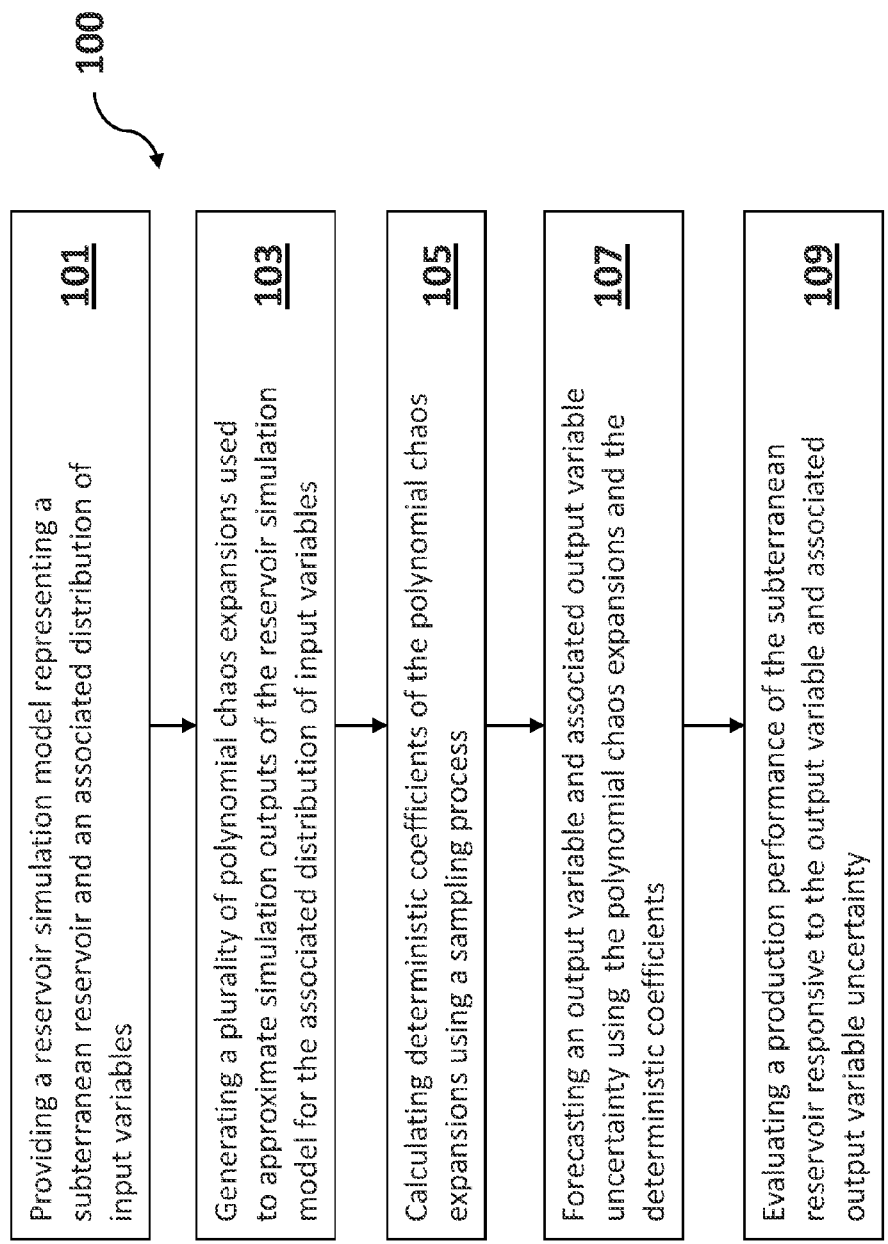
FIG. 6 is a flow diagram showing a computer-implemented method for quantifying uncertainty in reservoir simulation, according to an embodiment of the present invention.

FIG. 6 illustrates a flow diagram showing computer-implemented method 100 for evaluating a production performance of a subterranean reservoir, such as by quantifying uncertainty in reservoir simulation, according to an embodiment of the present invention. In step 101, a reservoir simulation model representing a subterranean reservoir and an associated distribution of input variables are provided. A plurality of polynomial chaos expansions, such as described by Equation (2), is generated in step 103. Each polynomial chaos expansion is used to approximate a simulation output of the reservoir simulation model for the distribution of input variables. In step 105, deterministic coefficients of the polynomial chaos expansions are calculated using a sampling process. For example, the deterministic coefficients of the polynomial chaos expansions can be calculated using Equations (8) and (9) with a quasi-Monte Carlo sampling method using a low discrepancy sequence, such as a Sobol sequence. In step 107, an output variable and associated output variable uncertainty are forecasted using the polynomial chaos expansions and the deterministic coefficients. For example, the output variable, such as cumulative oil production, cumulative water production, cumulative gas production, or net present value, can be forecasted using Equation (1). Production performance of the subterranean reservoir is evaluated in step 109 responsive to the output variable and associated output variable uncertainty.

Figure 7:
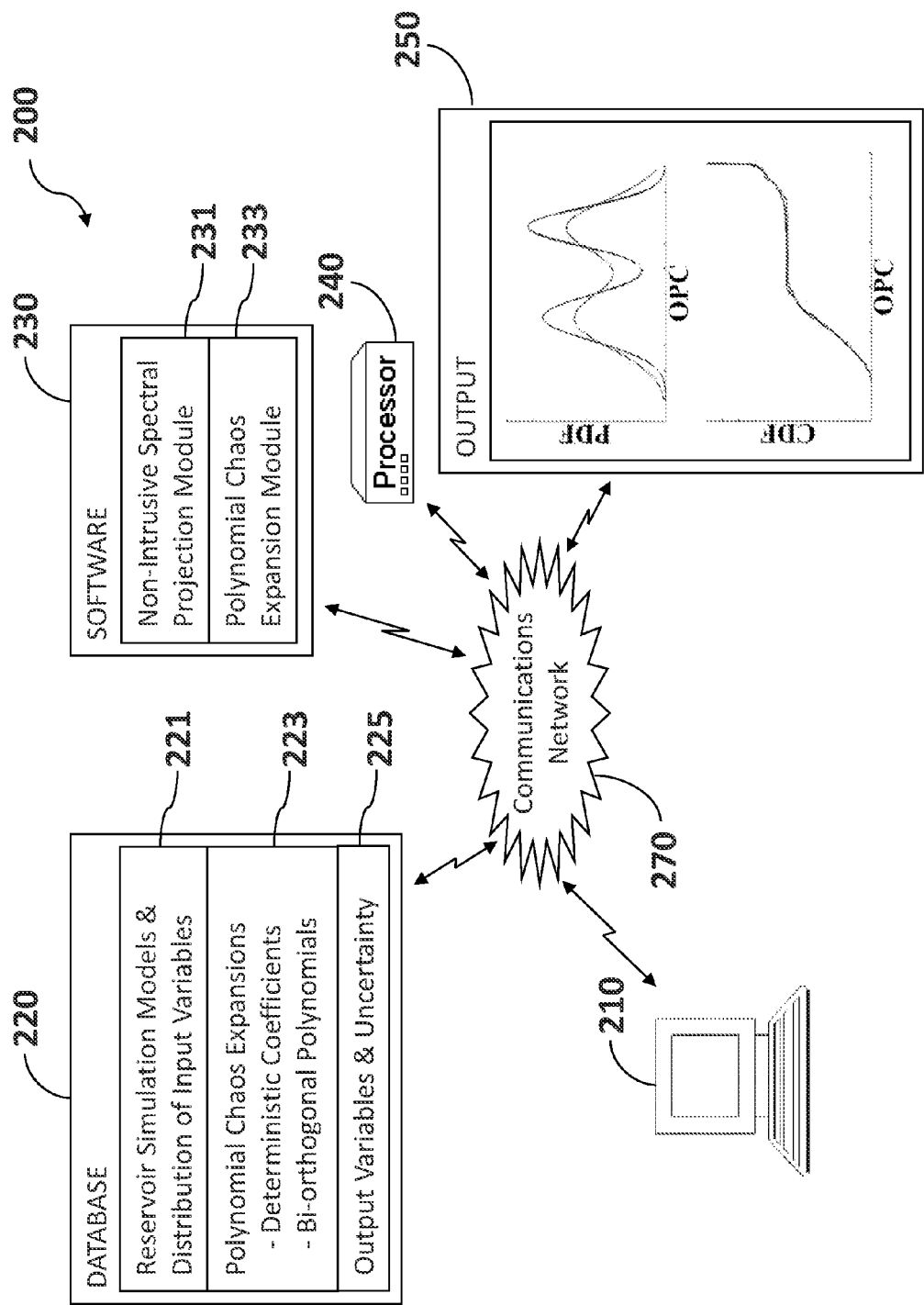
FIG. 7 shows a system for quantifying uncertainty in reservoir simulation, according to an embodiment of the present invention.

FIG. 7 illustrates a system 200 for quantifying uncertainty and evaluating production performance of a subterranean reservoir, such as by using computer-implemented method 100. System 200 includes user interface 210, such that an operator can actively input information and review operations of system 200. User interface 210 can be any means in which a person is capable of interacting with system 200 such as a keyboard, mouse, or touch-screen display. Operator-entered data input into system 200 through user interface 210, can be stored in database 220. For example, operator-entered data can include user-defined parameters such the order or number of terms for a polynomial chaos expansion and a number of simulations to be run. Additionally, any information generated by system 200 can be stored in database 220. Reservoir simulation models and a distribution of input variables 221, polynomial chaos expansions 223, and output variables and output variable uncertainty 225 are all examples of information that can be stored in database 220. Polynomial chaos expansions 223, such as those described by Equation (2), include deterministic coefficients and bi-orthogonal polynomials.

System 200 includes a computer program product or software 230 that is stored on a processor readable medium. Current examples of a processor readable medium include, but are not limited to, an electronic circuit, a semiconductor memory device, a ROM, a flash memory, an erasable programmable ROM (EPROM), a floppy diskette, a compact disk (CD-ROM), an optical disk, a hard disk, and a fiber optic medium. As will be described more fully herein, software 230 can include a plurality of modules for performing system tasks such as performing the methods, including method 100, previously described herein. Processor 240 interprets instructions to execute software 230, as well as, generates automatic instructions to execute software for system 200 responsive to predetermined conditions. Instructions from both user interface 210 and software 230 are processed by processor 240 for operation of system 200. In some embodiments, a plurality of processors can be utilized such that system operations can be executed more rapidly.

Examples of modules for software 230 include, but are not limited to, non-intrusive spectral projection module 231 and polynomial chaos expansion module 233. Polynomial chaos expansion module 233 is configured to generate polynomial chaos expansions 223. Polynomial chaos expansion module 233 is also configured to forecast output variable and associated output variable uncertainty 225. In particular, output variable and associated output variable uncertainty 225 are forecasted using polynomial chaos expansions 223, which includes bi-orthogonal polynomials, and the calculated deterministic coefficients. The deterministic coefficients are calculated by non-intrusive spectral projection module 231 using a sampling process. The sampling process used by non-intrusive spectral projection module 231 can be a quasi-Monte Carlo method using a low discrepancy sequence, such as a Sobol sequence. Typically, non-intrusive spectral projection module 231 calculates the deterministic coefficients of polynomial chaos expansions 223 to at least a $5^{th}$ order.

Non-intrusive spectral projection module 231 and polynomial chaos expansion module 233 can also cross-validate the deterministic coefficients. For example, non-intrusive spectral projection module 231 can calculate deterministic coefficients to a predetermined order. Polynomial chaos expansion module 233 can calculate an error from polynomial chaos expansions 223 using first order terms of polynomial chaos expansions 223 and the deterministic coefficients calculated to the predetermined order. The next higher order term is then added to the polynomial chaos expansions 223 and an updated error from the polynomial chaos expansions 223 is calculated. The higher order term last added to the polynomial chaos expansions 223 is maintained if the updated error is reduced, or removed if the updated error is increased. Increasing the order and comparing the error to the previous iteration is repeated until all of the order terms of polynomial chaos expansions 223 have been cross-validated.

In certain embodiments, system 200 can include reporting unit 250 to provide information to the operator or to other systems (not shown). For example, reporting unit 250 can be a printer, display screen, or a data storage device. However, it should be understood that system 200 need not include reporting unit 250, and alternatively user interface 210 can be utilized for reporting information of system 200 to the operator.

Communication between any components of system 200, such as user interface 210, database 220, software 230, processor 240 and reporting unit 250, can be transferred over a communications network 260. Communications network 260 can be any means that allows for information transfer. Examples of communications network 260 presently include, but are not limited to, a switch within a computer, a personal area network (PAN), a local area network (LAN), a wide area network (WAN), and a global area network (GAN). Communications network 260 can also include any hardware technology used to connect the individual devices in the network, such as an optical cable or wireless radio frequency.

In operation, an operator initiates software 230, through user interface 210, to perform the methods described herein. Outputs from each software module, such as non-intrusive spectral projection module 231 and polynomial chaos expansion module 233, can be stored in database 220. For example, software 230 can utilize non-intrusive spectral projection module 231 to calculate and cross-validate deterministic coefficients of polynomial chaos expansions 223. Software 230 can also utilize polynomial chaos expansion module 233 to forecast output variables and associated output variable uncertainty 225.

A visual display can be produced, such as through reporting unit 250 or user interface 210, using output variables and associated output variable uncertainty 225. For example, the output variables and associated output variable uncertainty 225 can be transformed into image data representations for display to a user or operator. The displayed information can be utilized to forecast or optimize the production performance of the subterranean reservoir, which can then be used for reservoir management decisions.

Examples

The above described methods and systems are demonstrated on two small, but realistic reservoir simulations models. The results are compared to Monte Carlo simulations for validation. Additionally, in the first example, results are compared to those obtained using the probabilistic collocation method for solving the coefficients of the polynomial chaos expansions. As demonstrated by these examples, the disclosed methods and systems are able to handle continuous, and a combination of continuous and discrete, input distributions, as well as, quantify uncertainty in the forecasted cumulative oil, gas, and water production.

Figure 8:
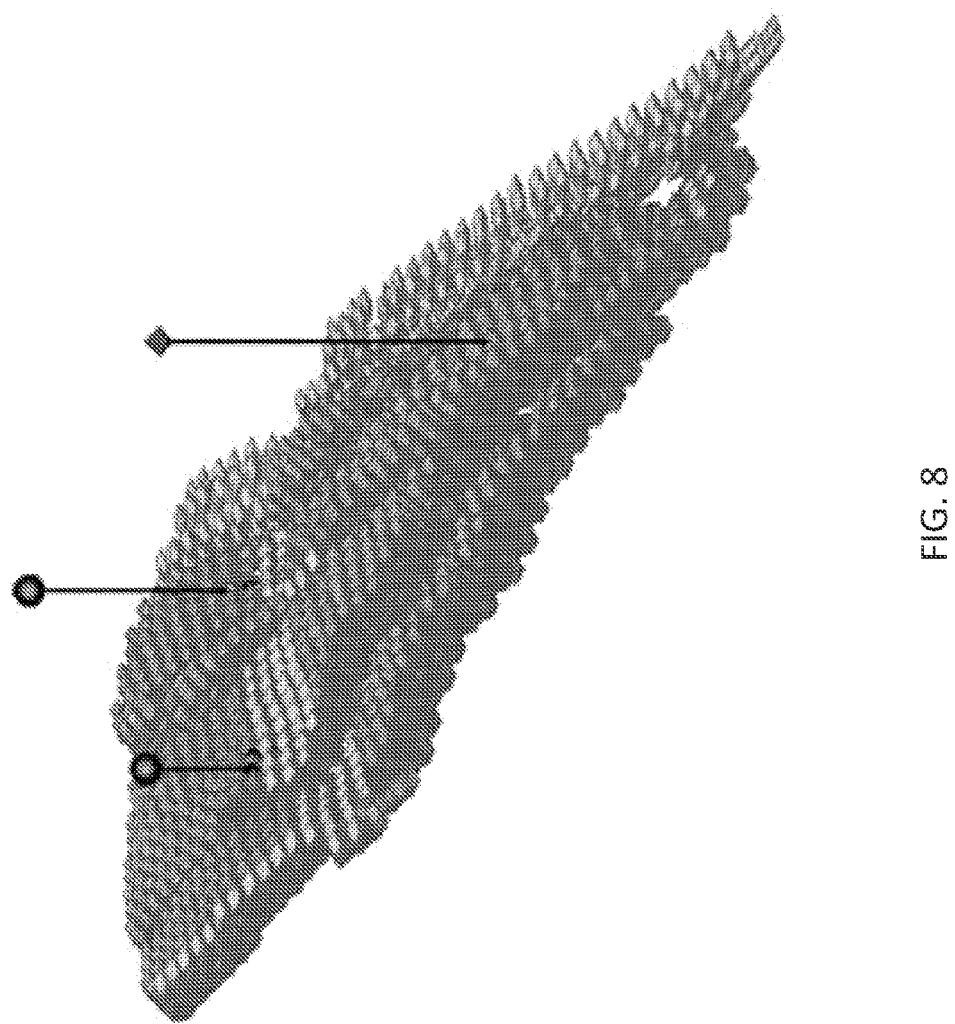
FIG. 8 illustrates a structure map of reservoir model A.

FIG. 8 shows reservoir simulation model A, which is a sector model of a real compartmentalized oil reservoir. Reservoir simulation model A includes one water injector well and two producer wells. The model has 27×46×36=44,712 cells, of which 19,922 are active. There are a number of faults in the system, and for two of the faults the transmissibility multipliers are uncertain. Each compartment of the reservoir simulation model is modeled using different equilibrium regions and reservoir rock properties are populated using 3 facies distributions. The total simulated time period is 10 years. Five reservoir parameters are considered uncertain with uniform distributions, as shown in the table below.

| Parameter Description | Minimum | Maximum |
| --- | --- | --- |
| Transmissibility multiplier for fault 2 | 0.0 | 10.0 |
| Transmissibility multiplier for fault 4 | 0.0 | 10.0 |
| Pore volume multiplier for equilibrium region 1 | 1 | 10 |
| Pore volume multiplier for equilibrium regions 2 and 6 | 0.5 | 1.5 |
| kx/kz multiplier for facies #3 | 0.01 | 5.0 |

Figure 9A:
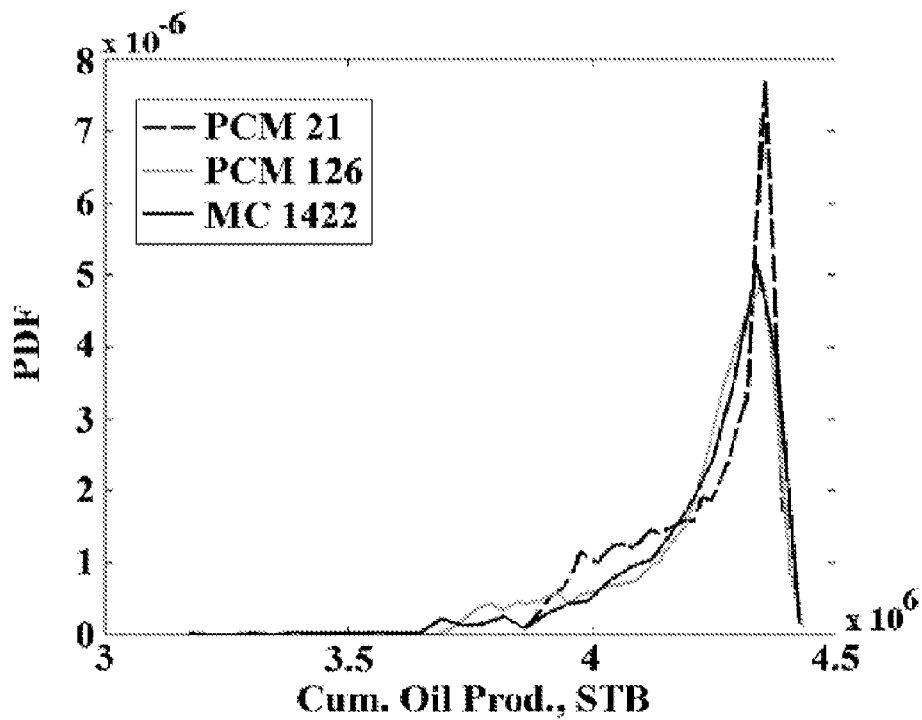
FIGS. 9A and 9B compare probability density functions of cumulative oil production using the probabilistic collocation method to a reference probability density function obtained by Monte Carlo simulation.

FIG. 9 shows probability density functions of cumulative field oil production at the end of simulation time, obtained with the PCM and Monte Carlo simulations. The Monte Carlo simulations, which included 1422 simulation runs, are chosen as the reference solution since there is no analytical solution for this example. As shown in FIG. 9A, the $2^{nd}$ order PCM requires 21 simulations and shows some deviation from Monte Carlo results. The $4^{th}$ order PCM requires 126 simulations, but is in better agreement with the Monte Carlo results.

Figure 9B:
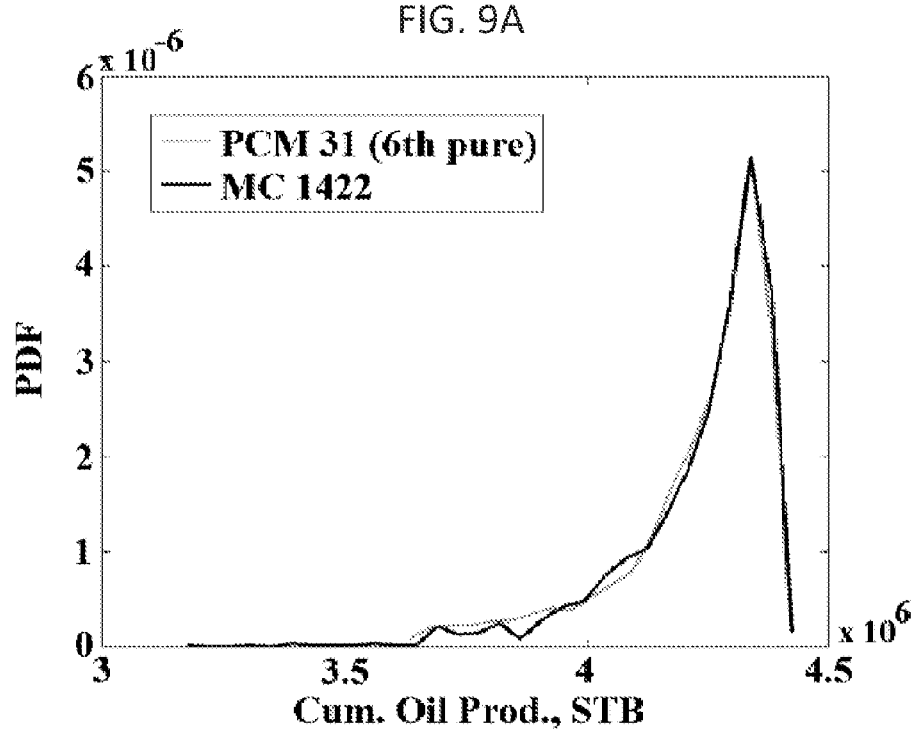

As previously discussed, the number of total simulations in PCM increases very fast as the order of the polynomial chaos expansion increases. This problem can be mitigated by only using the pure terms of the PCE, and discarding all of the cross terms. With this approach, if the order is increased up to 6 while removing cross terms, only 31 simulations are required. FIG. 9B shows that with this approach, a $6^{th}$ order pure PCM matches the Monte Carlo results very well in this example. However, as discussed earlier, there is no way of knowing beforehand if cross-terms will be important or not, and further, the guarantee of convergence of the distribution is no longer applicable. Thus, the approach of removing cross terms is not applicable to a general problem.

Figure 10A:
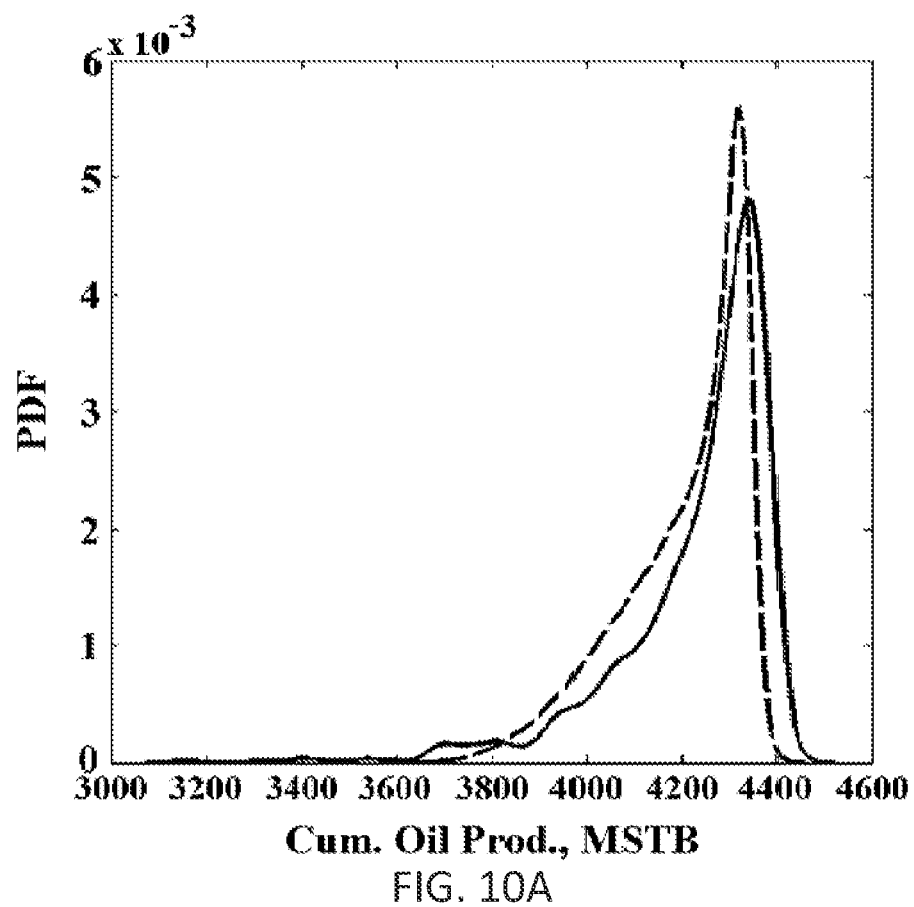
FIGS. 10A and 10B compare probability density functions of cumulative oil production using a polynomial chaos expansion with NISP to a reference probability density function obtained by Monte Carlo simulation, according to an embodiment of the present invention.
Figure 10B:
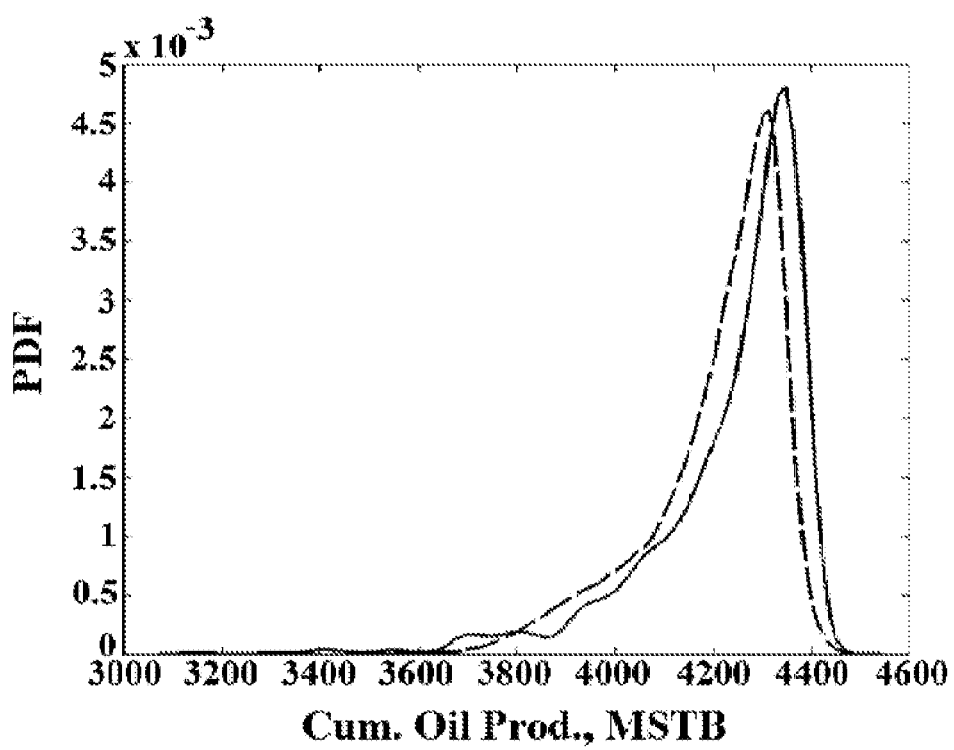

FIG. 10 shows the probability density functions obtained using NISP simulations, according to embodiments of the present invention. In FIG. 10A, 126 simulations are used. In FIG. 10B, 200 simulations are used. The highest order of the PCE is determined automatically during the cross validation process and depends on the number of simulations. This is an important benefit as the user cannot determine beforehand what order of PCE to use given a particular number of simulations. Even more importantly, no assumptions about the importance of the cross terms are made in this approach. The results are similar to those obtained with the PCM. However if a full $6^{th}$ order PCE was used, 462 simulations would be required with PCM.

Figure 11:
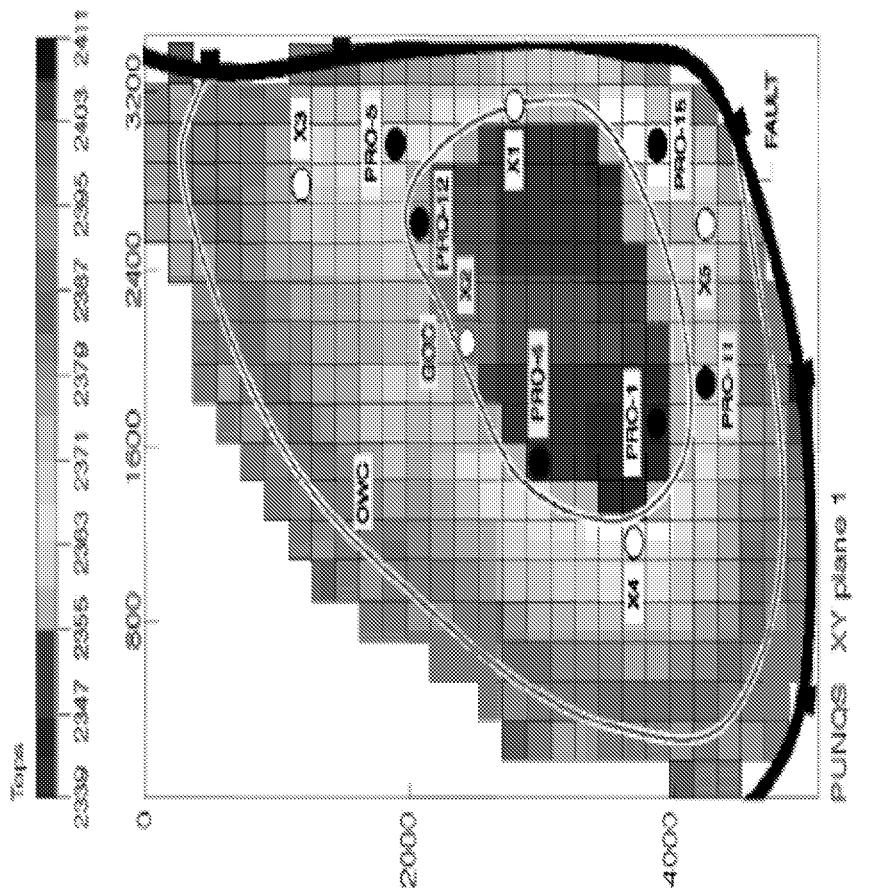
FIG. 11 illustrates a structure map of reservoir model B.

FIG. 11 shows a structural map of reservoir simulation model B, which is based on a real reservoir field. The model contains 19×28×5 grid blocks, of which 1761 blocks are active. The top structure map of the field is bounded to the east and south by a fault, and is connected to the north and west to a fairly strong aquifer. A small gas cap is located in the center of the dome shaped structure. The field contains 6 production wells located around the gas-oil contact.

In this example, 6 reservoir properties are considered to be uncertain, and all other properties are assumed to be known with certainty. However, a key difference compared to reservoir simulation model A is that the pore volume multiplier has a discrete binary distribution instead of a uniform distribution. The table below shows the uncertain parameters with their ranges and distributions:

| Parameter Description | Minimum | Maximum | Distribution |
|---|---|---|---|
| Pore volume multiplier | 0.2 | 1 | Binary with equal probability |
| Transmissibility multiplier A | 0.5 | 1.5 | Uniform |
| Transmissibility multiplier B | 0.5 | 1.5 | Uniform |
| Transmissibility multiplier C | 0.1 | 1 | Uniform |
| Oil-Water Contact | 2390 ft | 2400 ft | Uniform |
| Gas-Oil Contact | 2350 ft | 2360 ft | Uniform |

Monte Carlo simulation with 3000 runs is carried out to obtain the reference distributions of cumulative oil, water, and gas production. NISP simulation is then applied to the model with 64 simulations, according to an embodiment of the present invention.

Figures 12A, 12B:
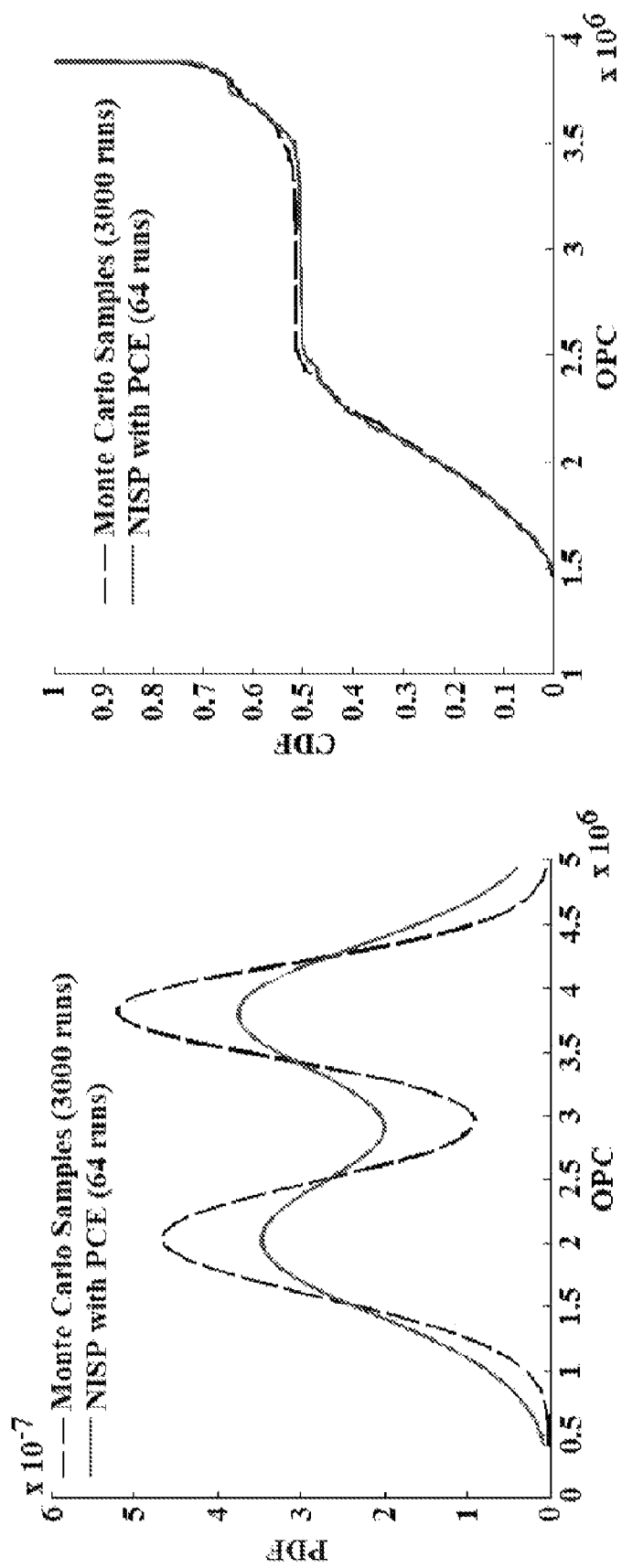
FIG. 12 compares probability density functions of cumulative oil (12A), gas (12C), and water (12E) production and cumulative distribution functions of cumulative oil (12B), gas (12D), and water (12F) production obtained using NISP to reference probability density functions and cumulative distribution functions obtained by Monte Carlo simulation, according to embodiments of the present invention.
Figures 12C, 12D:
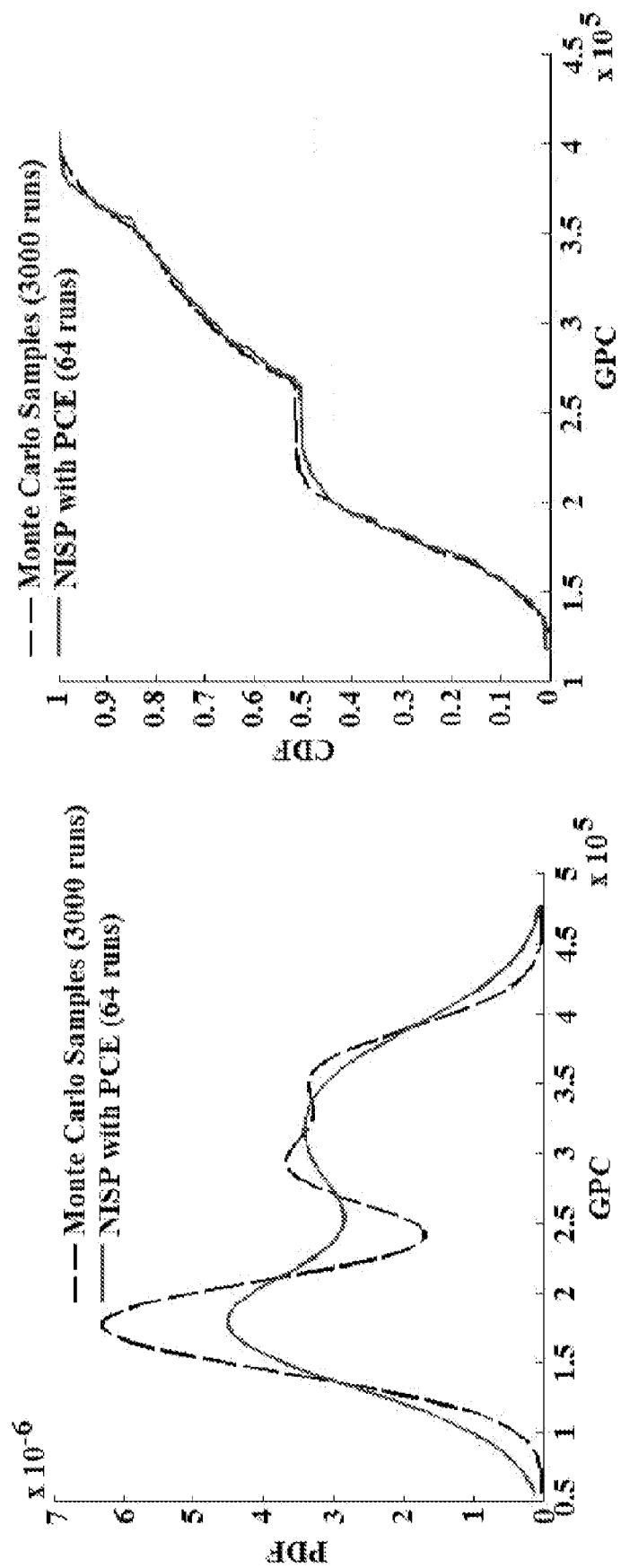
Figures 12E, 12F:
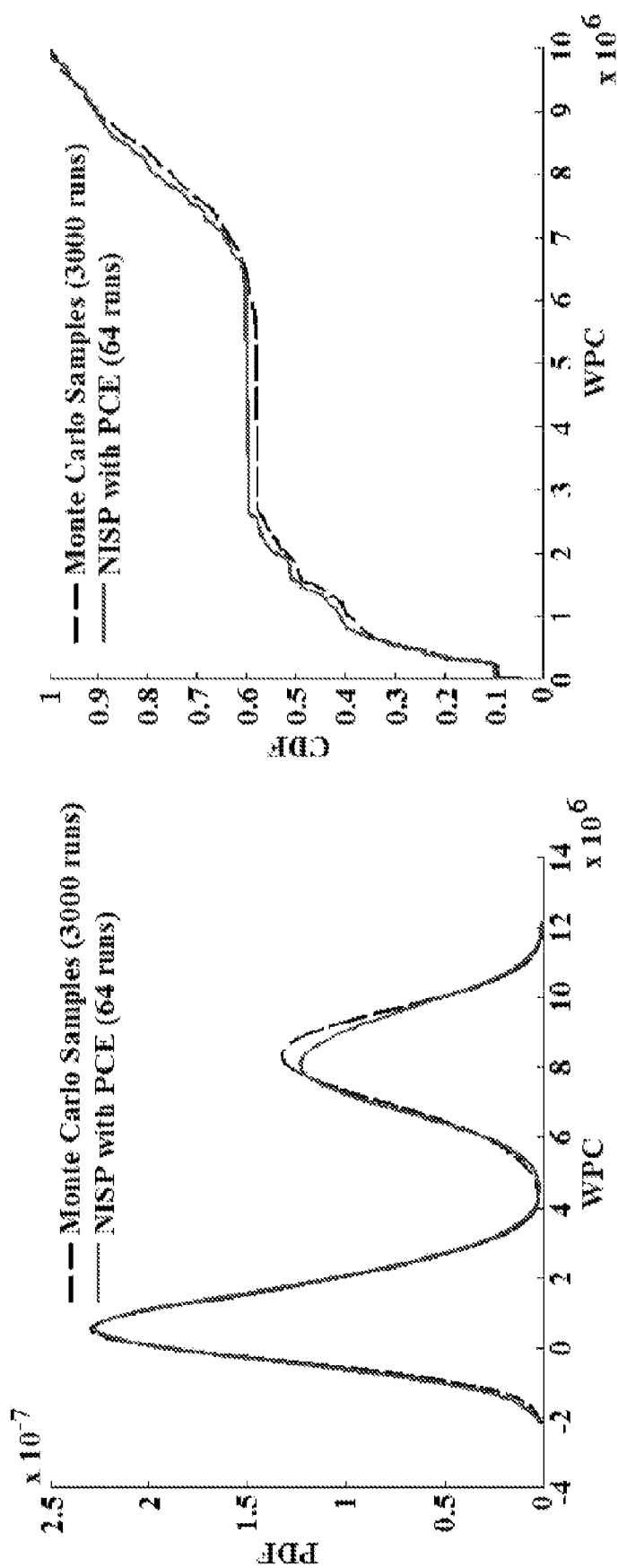

FIG. 12 compares the probability density functions (12A) and the cumulative distribution functions (12B) obtained using Monte Carlo simulations and NISP for cumulative oil, gas and water production. The results for the Monte Carlo simulations are shown in dashed line and the results for the NISP simulations are shown in solid line. Although the cumulative distribution functions obtained from NISP are very close to those obtained from the Monte Carlo simulations, as are the P10, P50, and P90 estimates (not shown), the probability density functions for oil and gas are somewhat different. This is likely due to the bimodal nature of the probability density functions, which is a result of the discrete binary distribution of the pore volume multiplier. Capturing the bimodality correctly is difficult with a small number of simulations.

Figure 13A:
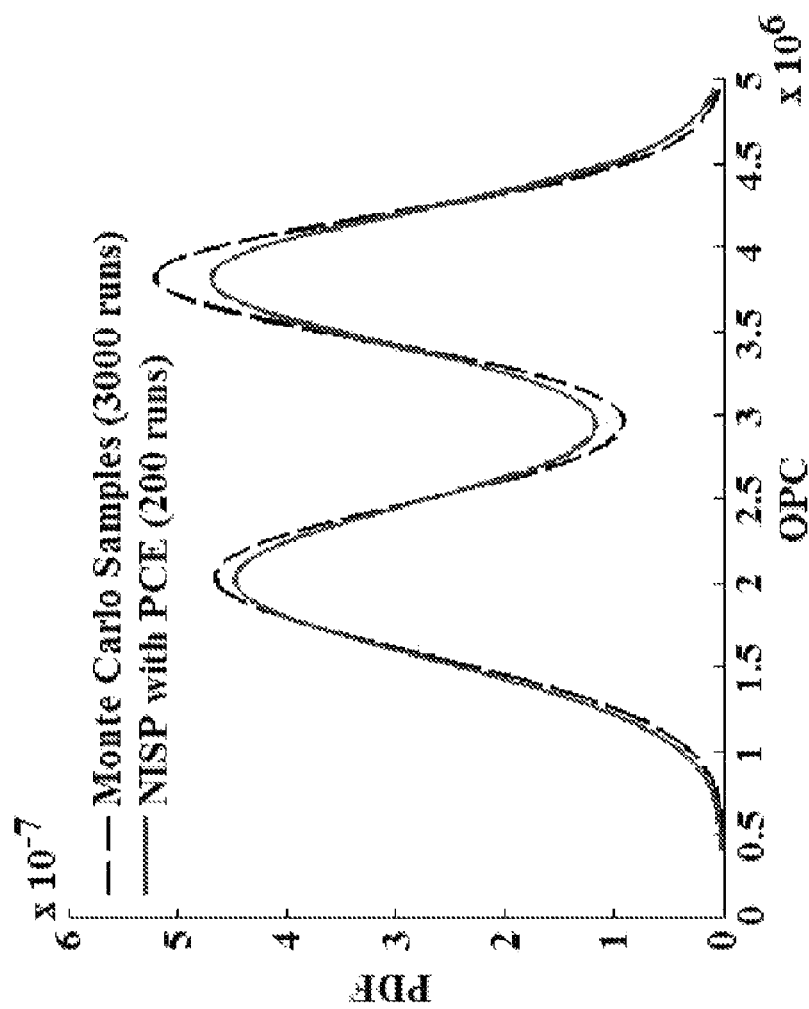
FIG. 13 compares probability density functions of cumulative oil (13A), gas (13B), and water (13C) production obtained using a polynomial chaos expansion with a sampling approach for determining coefficients to a reference probability density function obtained by Monte Carlo simulation, according to embodiments of the present invention.
Figure 13B:
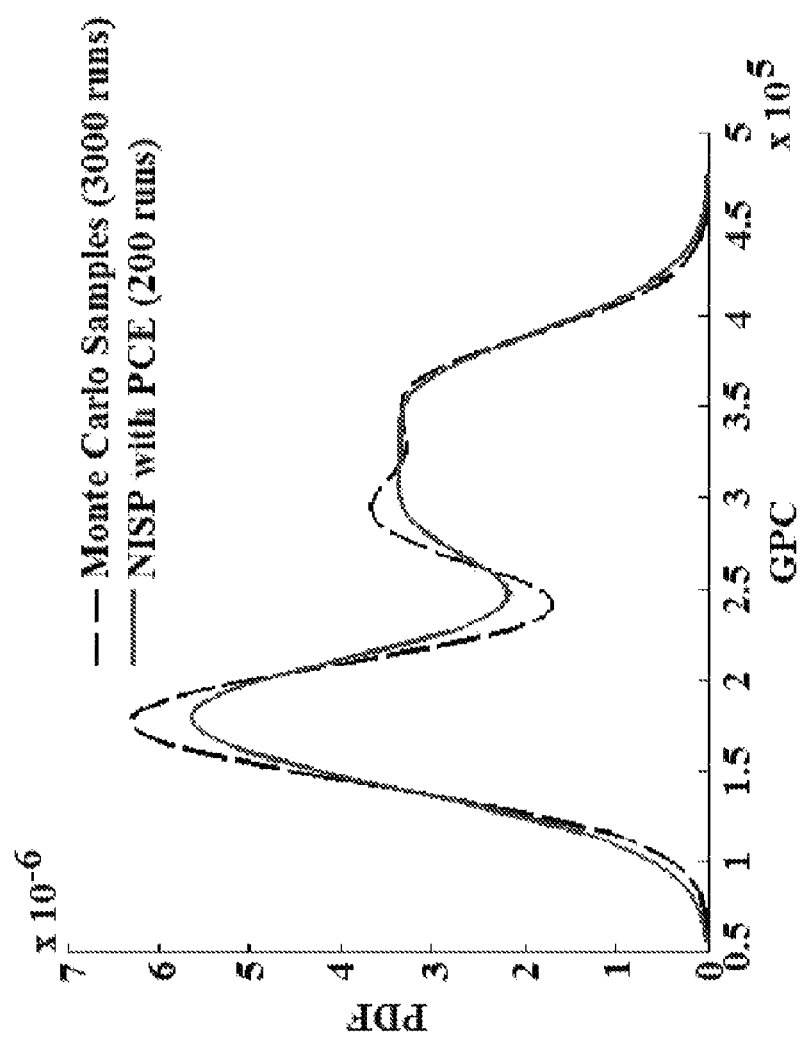
Figure 13C:
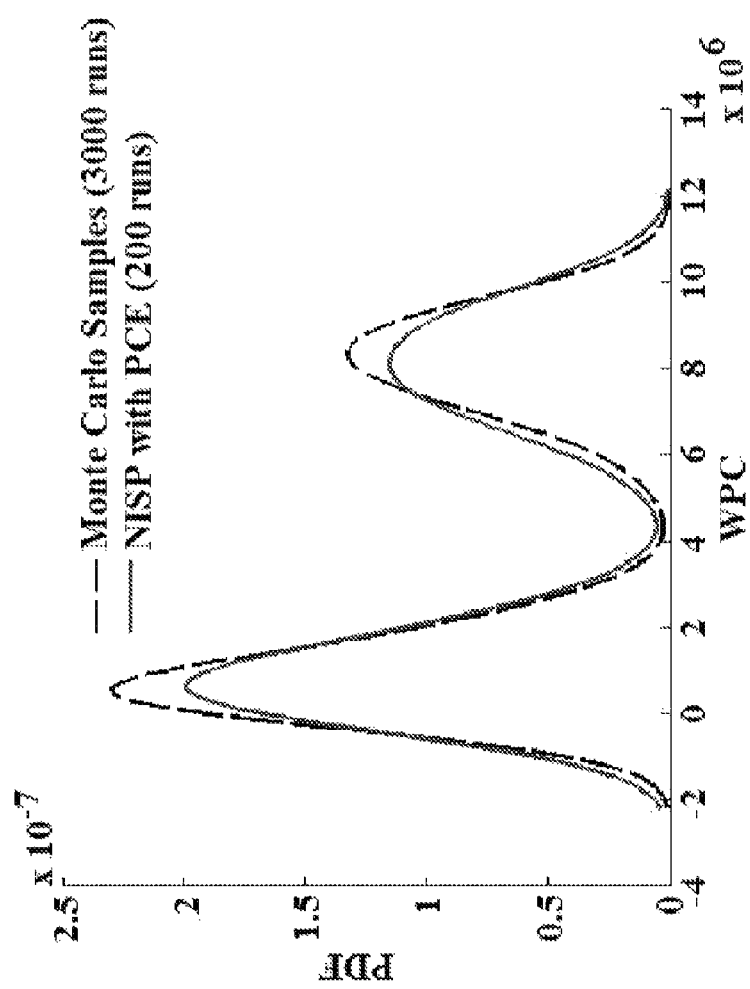

FIG. 13 increases the number of samples or simulations to 200, which is still reasonable compared to the much larger number of simulations for the Monte Carlo method. As can be seen in FIG. 13, a much better agreement to the probability density functions is obtained.

Accordingly, as demonstrated through these examples, the methods and systems disclosed herein can accurately and efficiently be utilized to assess uncertainty outputs of reservoir simulation models such as cumulative oil, gas and water productions. Non-intrusive spectral projection is utilized to estimate the deterministic coefficients of bi-orthogonal polynomial chaos expansions. As previously described, polynomial chaos expansions are capable of encapsulating the possibly nonlinear relationships between input and output random variables and therefore, can be used as proxies to the simulation model for efficient uncertainty quantification. Polynomial chaos expansions have a significant advantage over other proxies or response surfaces as they convergence to the true distribution of the output random variable of interest, such as cumulative oil production, as the order of the polynomial chaos expansion and number of simulations used for calculation of the deterministic coefficients is increased. A low discrepancy quasi Monte Carlo sampling approach is used in the non-intrusive spectral projection. For example, Sobol sequences can be used for sampling as they demonstrate linear error convergence of the estimate of the PCE coefficients for a reasonably large number of input random variables. This makes the number of simulations almost independent of the number of random variables and the order of the polynomial chaos expansions. As a result, the disclosed invention is much more efficient for large-scale problems with many input random variables. Furthermore, statistically rigorous error estimates of the coefficients of the polynomial chaos expansions are also provided with this approach. A robust approach for eliminating the coefficients of the polynomial chaos expansions that have been estimated incorrectly, thereby improving the accuracy and robustness of NISP, is also disclosed.

While in the foregoing specification this invention has been described in relation to certain preferred embodiments thereof, and many details have been set forth for the purpose of illustration, it will be apparent to those skilled in the art that the invention is susceptible to alteration and that certain other details described herein can vary considerably without departing from the basic principles of the invention.

What is claimed is:

1. A computer-implemented method for quantifying uncertainty and evaluating production performance of a subterranean reservoir, the method comprising:
    (a) providing a reservoir simulation model representing a subterranean reservoir and an associated distribution of input variables;
    (b) generating a plurality of polynomial chaos expansions, each polynomial chaos expansion being used to approximate a simulation output of the reservoir simulation model for the associated distribution of input variables;
    (c) calculating deterministic coefficients of the polynomial chaos expansions using numerical integration with deterministic sampling process;
    (d) forecasting an output variable and associated output variable uncertainty using the polynomial chaos expansions and the deterministic coefficients; and
    (e) evaluating production performance of the subterranean reservoir responsive to the output variable and associated output variable uncertainty.

2. The computer-implemented method of claim 1, wherein the deterministic coefficients of the polynomial chaos expansion are calculated to at least a $5^{th}$ order.

3. The computer-implemented method of claim 1, wherein the deterministic coefficients are calculated using non-intrusive spectral projection.

4. The computer-implemented method of claim 1, wherein the deterministic sampling process comprises a quasi-Monte Carlo method.

5. The computer-implemented method of claim 4, wherein the deterministic sampling process produces an error convergence rate of $O(1/N_s)$.

6. The computer-implemented method of claim 1, wherein the deterministic sampling process utilizes a Sobol sequence.

7. The computer-implemented method of claim 1, wherein calculating deterministic coefficients in step (c) further comprises cross-validating the deterministic coefficients.

8. The computer-implemented method of claim 1, wherein calculating deterministic coefficients in step (c) further comprises:
    (i) calculating an error from the polynomial chaos expansions using first order terms of the polynomial chaos expansions and the deterministic coefficients calculated to the predetermined order;
    (ii) adding the next higher order term to the polynomial chaos expansions and calculating an updated error from the polynomial chaos expansions;
    (iii) maintaining the next higher order term of the polynomial chaos expansions if the updated error is reduced;
    (iv) removing the next higher order term of the polynomial chaos expansions if the updated error is increased; and
    (v) repeating steps (ii)-(iv) until each order term of the polynomial chaos expansions has been cross-validated.

9. The computer-implemented method of claim 1, wherein the output variable and associated output variable uncertainty are output as a probability density function.

10. The computer-implemented method of claim 1, wherein the output variable and associated output variable uncertainty are output as a cumulative distribution function.

11. The computer-implemented method of claim 1, wherein the output variable is cumulative oil production.

12. A system for quantifying uncertainty and evaluating production performance of a subterranean reservoir, the system comprising:
a database configured to store data comprising a reservoir simulation model representing a subterranean reservoir, a distribution of input variables, polynomial chaos expansions, deterministic coefficients of the polynomial chaos expansions, output variables, and output variable uncertainty;
a computer processor configured to receive the stored data from the database, and to execute software using the stored data; and
a software program executable on the computer processor, the software program comprising:
a non-intrusive spectral projection module configured to calculate the deterministic coefficients of the polynomial chaos expansions using numerical integration with deterministic sampling, each polynomial chaos expansion being used to approximate a simulation output of the reservoir simulation model for the distribution of input variables; and
a polynomial chaos expansion module configured to generate the polynomial chaos expansions and to forecast an output variable and associated output variable uncertainty using the polynomial chaos expansions and the deterministic coefficients calculated by the non-intrusive spectral projection module.

13. The system of claim 12, wherein the non-intrusive spectral projection module calculates the deterministic coefficients of the polynomial chaos expansions to at least a $5^{th}$ order.

14. The system of claim 12, wherein the deterministic sampling process used by the non-intrusive spectral projection module comprises a quasi-Monte Carlo method using Sobol sequence.

15. The system of claim 14, wherein the quasi-Monte Carlo method using the Sobol sequence produces an error convergence rate of $O(1/N_s)$.

16. The system of claim 12, wherein the deterministic coefficients are cross-validated using the non-intrusive spectral projection module and the polynomial chaos expansion module.

17. The system of claim 12, wherein:
the non-intrusive spectral projection module is further configured to calculate the deterministic coefficients to a predetermined order; and
the polynomial chaos expansion module is further configured to:
(i) calculate an error from the polynomial chaos expansions using first order terms of the polynomial chaos expansions and the deterministic coefficients calculated to the predetermined order;
(ii) add the next higher order term to the polynomial chaos expansions and calculate an updated error from the polynomial chaos expansions;
(iii) maintain the next higher order term of the polynomial chaos expansions if the updated error is reduced;
(iv) remove the next higher order term of the polynomial chaos expansions if the updated error is increased; and
(v) repeat steps (ii)-(iv) until each order term of the polynomial chaos expansions has been cross-validated.

18. The system of claim 12, wherein the system further comprises a display that communicates with polynomial chaos expansion module of the software program such that the output variable and associated output variable uncertainty are transformed into image data representations that are output to the display.

19. A computer program product, comprising a non-transitory computer usable medium having a computer readable program code embodied therein, the computer readable program code comprising:
a non-intrusive spectral projection module configured to calculate deterministic coefficients of polynomial chaos expansions using numerical integration with deterministic sampling, each polynomial chaos expansion being used to approximate a simulation output of the reservoir simulation model for a distribution of input variables; and
a polynomial chaos expansion module configured to generate the polynomial chaos expansions and to forecast an output variable and associated output variable uncertainty using the polynomial chaos expansions and the deterministic coefficients calculated by the non-intrusive spectral projection module.

20. The computer program product of claim 19, wherein:
the non-intrusive spectral projection module is further configured to calculate the deterministic coefficients to a predetermined order; and
the polynomial chaos expansion module is further configured to:
(i) calculate an error from the polynomial chaos expansions using first order terms of the polynomial chaos expansions and the deterministic coefficients calculated to the predetermined order;
(ii) add the next higher order term to the polynomial chaos expansions and calculate an updated error from the polynomial chaos expansions;
(iii) maintain the next higher order term of the polynomial chaos expansions if the updated error is reduced;
(iv) remove the next higher order term of the polynomial chaos expansions if the updated error is increased; and
(v) repeat steps (ii)-(iv) until each order term of the polynomial chaos expansions have been cross-validated.

* * * * *